US008138945B2

(12) United States Patent
Hayakawa et al.

(10) Patent No.: US 8,138,945 B2
(45) Date of Patent: Mar. 20, 2012

(54) SENSOR NODE

(75) Inventors: Miki Hayakawa, Cambridge, MA (US); Norihiko Moriwaki, Hino (JP); Kazuo Yano, Hino (JP); Satomi Tsuji, Kokubunji (JP); Norio Ohkubo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 972 days.

(21) Appl. No.: 12/153,689

(22) Filed: May 22, 2008

(65) Prior Publication Data

US 2008/0297373 A1 Dec. 4, 2008

(30) Foreign Application Priority Data

May 30, 2007 (JP) ................................. 2007-143642

(51) Int. Cl.
*G08C 19/04* (2006.01)
(52) U.S. Cl. ................................. 340/870.39
(58) Field of Classification Search .............. 340/870.39
See application file for complete search history.

(56) References Cited

U.S. PATENT DOCUMENTS

2005/0235091 A1* 10/2005 Chen et al. .................... 710/313
2006/0229520 A1   10/2006 Yamashita et al.

FOREIGN PATENT DOCUMENTS

| JP | 2004-178045 | 11/2002 |
| JP | 2004-235965 | 1/2003 |
| JP | 2006-312010 | 8/2005 |

OTHER PUBLICATIONS

Mathew Laibowitz, et al., "A Sensor Network for Social Dynamics", 5th International Conference on Information Processing in Sensor Networks (IPSN), (Apr. 2006); pp. 483-491.
Joan Morris DiMicco, et al., "Using Visualizations to Review a Group's Interaction Dynamics," Conference on Human Factors in Computing Systems (CHI), (Apr. 2006); (6 pages).
Peter A. Gloor, et al., "Studying Microscopic Peer-to-Peer Communication Patterns," Americas Conference on Information Systems (AMCIS), (Aug. 2007) (12 pages).
Daniel Olguin Olguin, et al., "Wearable Communicator Badge: Designing a New Platform for Revealing Organizational Dynamics," IEEE 10th International Symposium on Wearable Computing (Doctoral Colloquium Proceedings), Montreaux, Switzerland (Oct. 2006) (3 pages).

* cited by examiner

*Primary Examiner* — Rexford N Barnie
*Assistant Examiner* — Tien Mai
(74) *Attorney, Agent, or Firm* — Stites & Harbison, PLLC; Juan Carlos A. Marquez, Esq.

(57) ABSTRACT

There is disclosed a sensor node capable of transmitting and receiving a large amount of data or data desired to be reliable without missing data, while preventing battery exhaustion and unnecessary compression of the transmission bandwidth. A name-tag type sensor node includes a detector for detecting connection of an external power supply. When the detector detects that the external power is supplied, the name-tag type sensor node transmits and receives a large amount of data, such as bulk transmission data, at an increased frequency by means of a data selector, a communication timing controller, and a wireless communication controller. Alternatively, the name-tag type sensor node transmits and receives the data desired to be reliable, such as rewriting data of firmware.

20 Claims, 17 Drawing Sheets

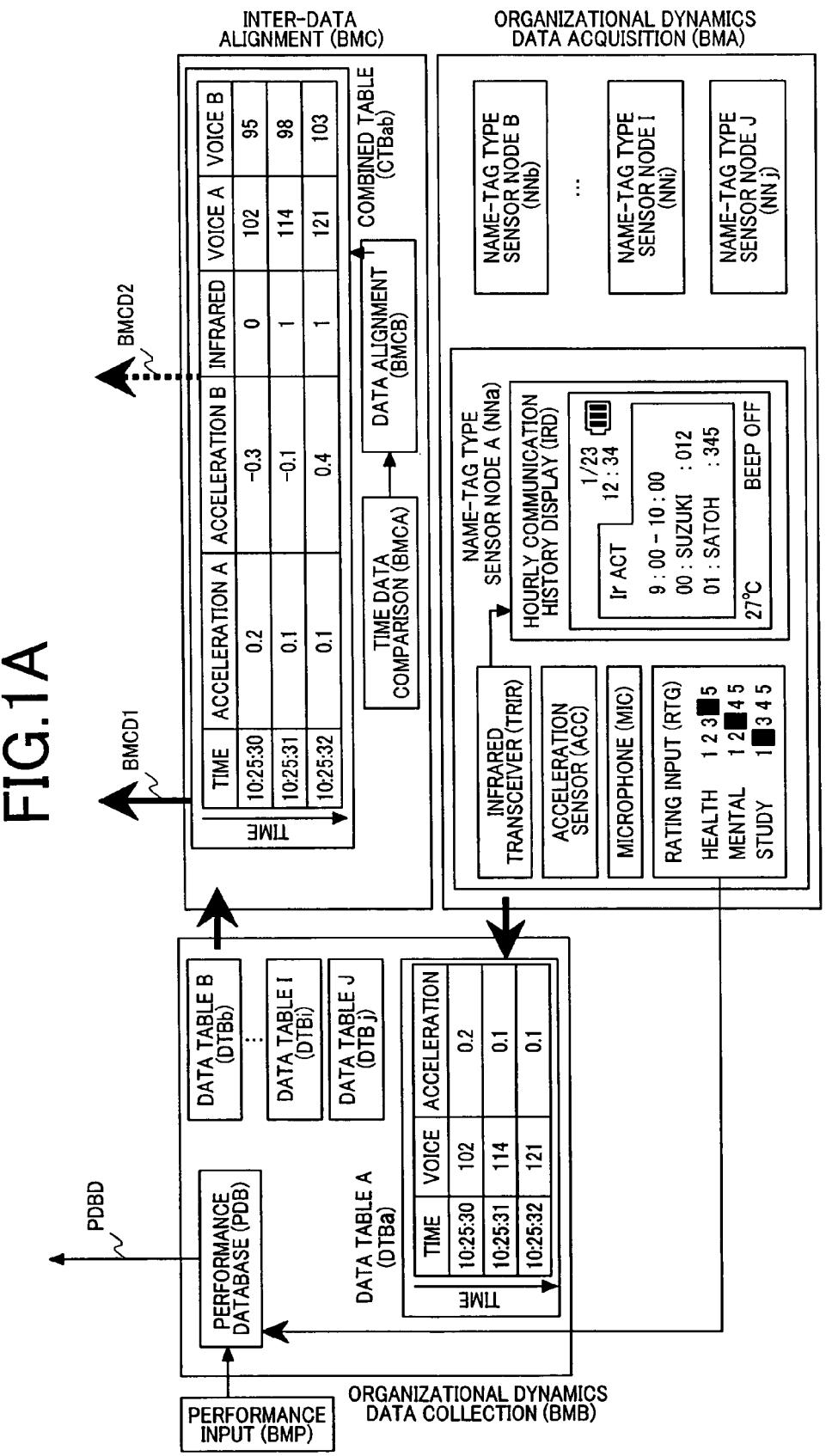

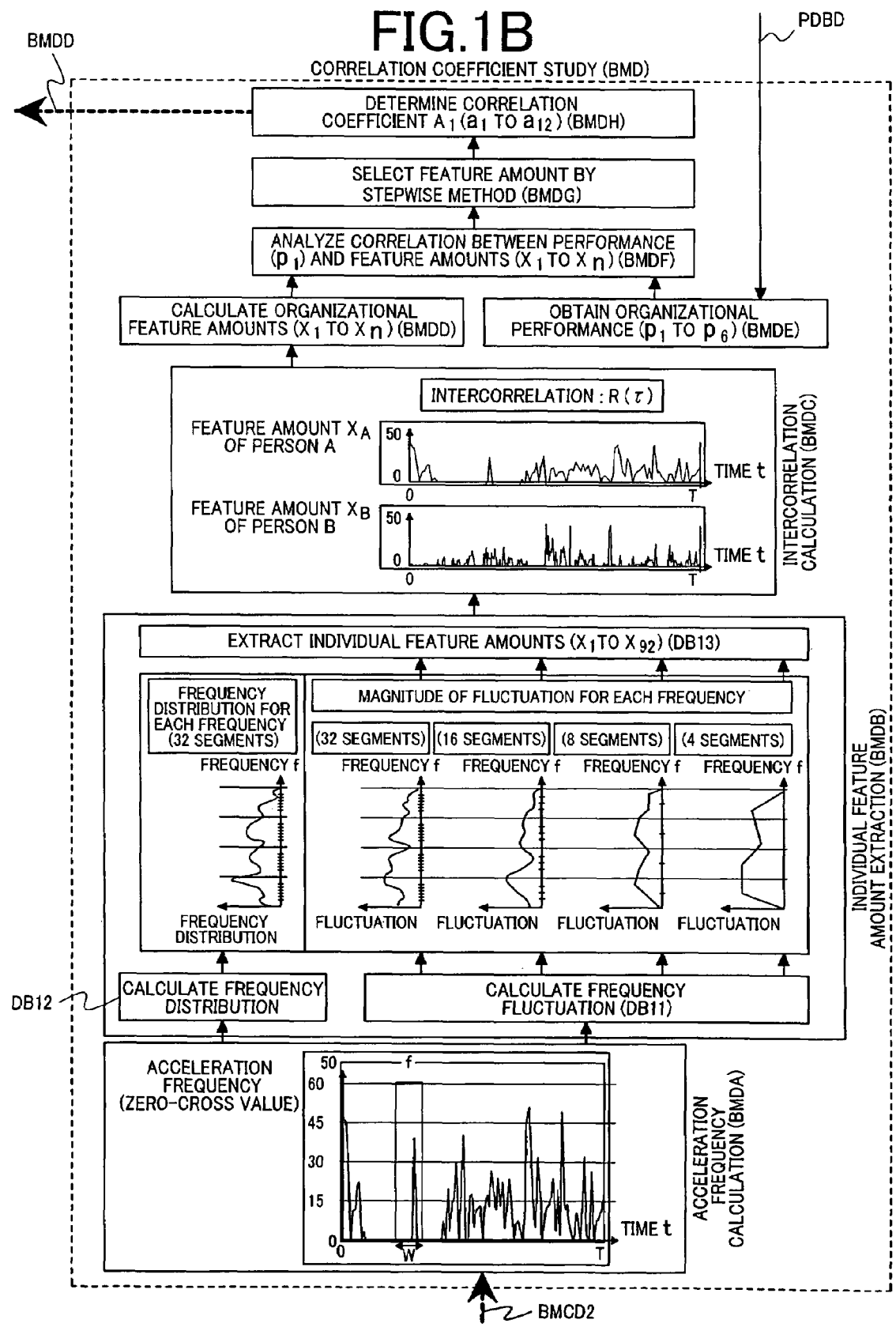

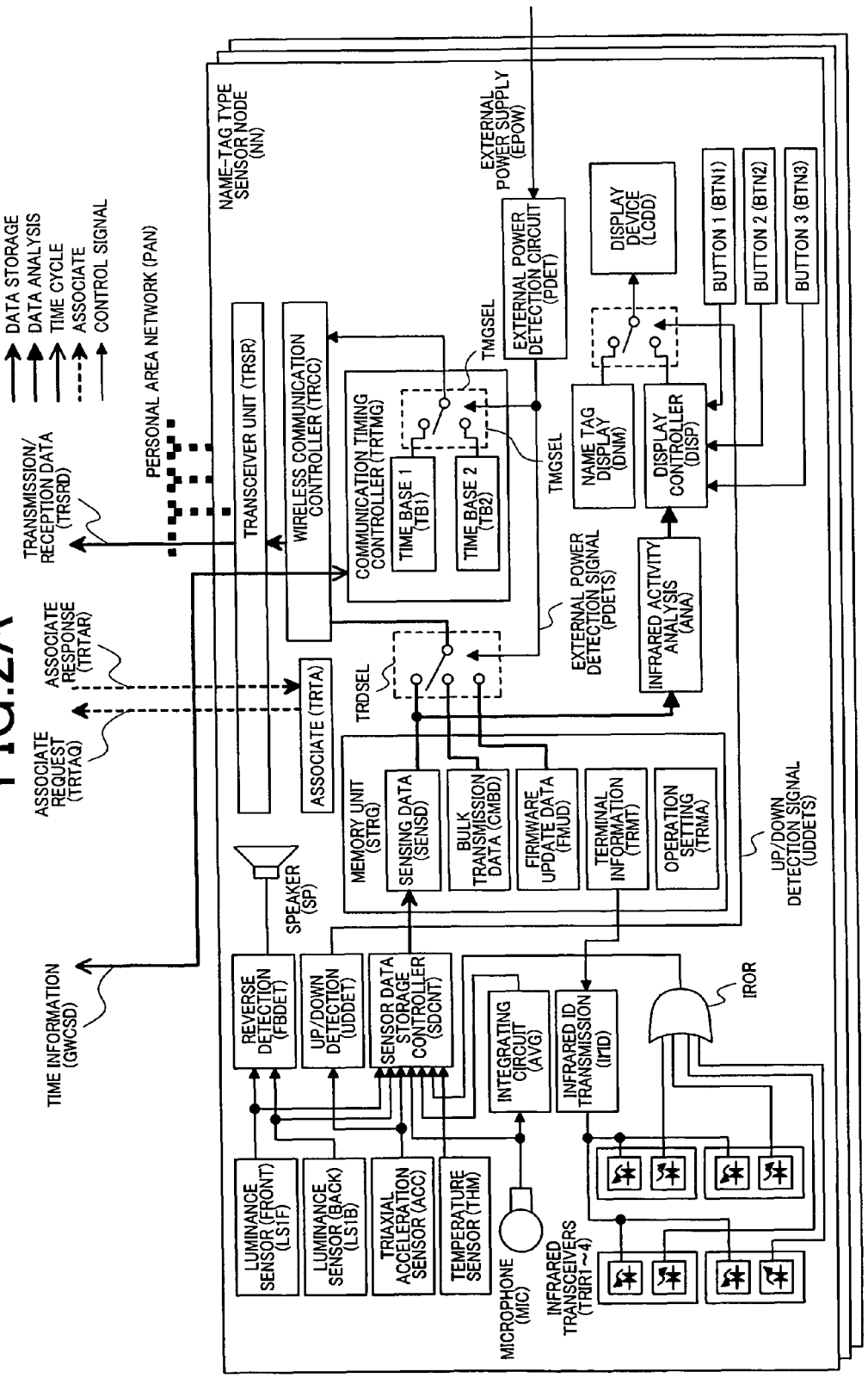

FIG.11
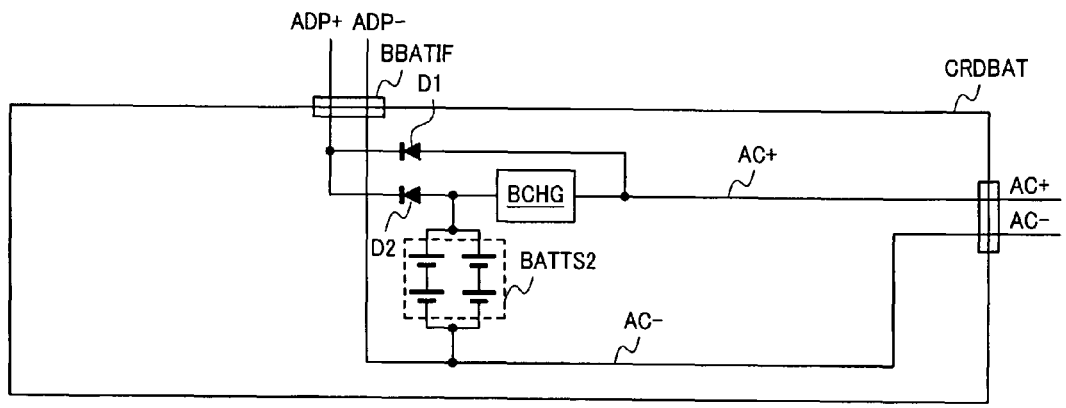
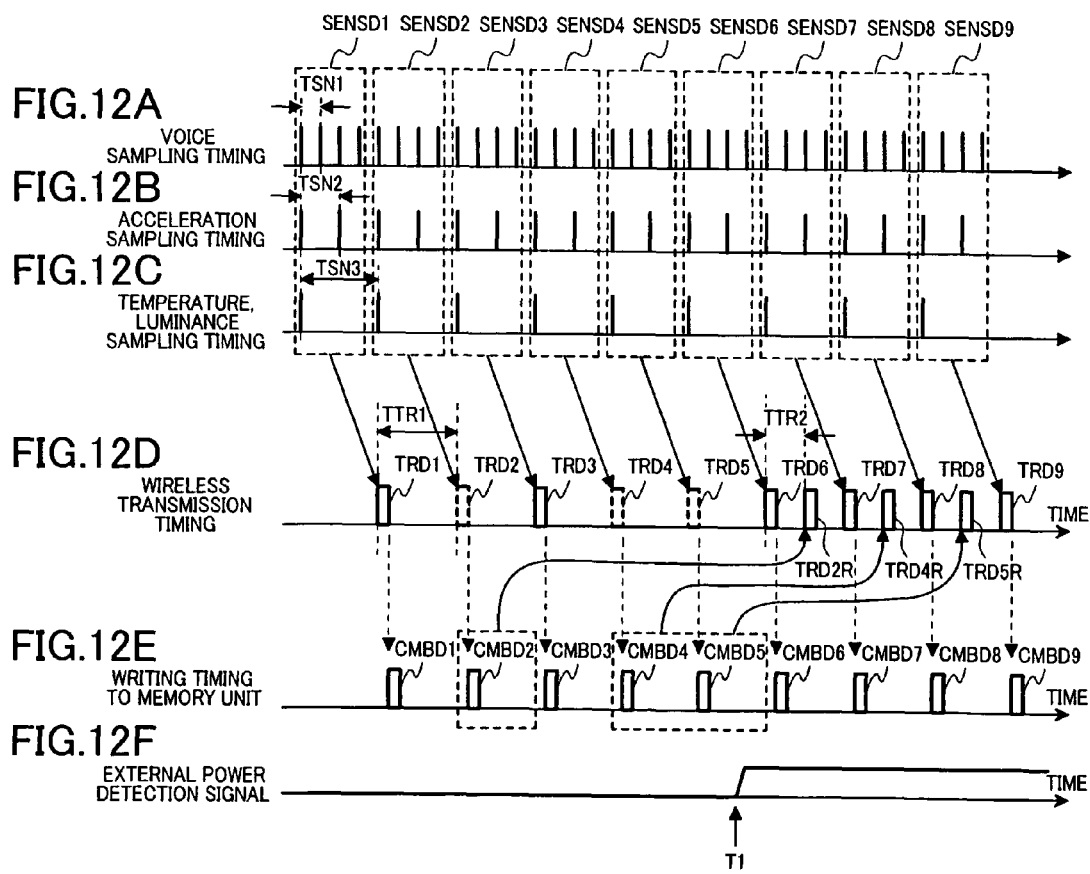
FIG.12A VOICE SAMPLING TIMING
FIG.12B ACCELERATION SAMPLING TIMING
FIG.12C TEMPERATURE, LUMINANCE SAMPLING TIMING
FIG.12D WIRELESS TRANSMISSION TIMING
FIG.12E WRITING TIMING TO MEMORY UNIT
FIG.12F EXTERNAL POWER DETECTION SIGNAL

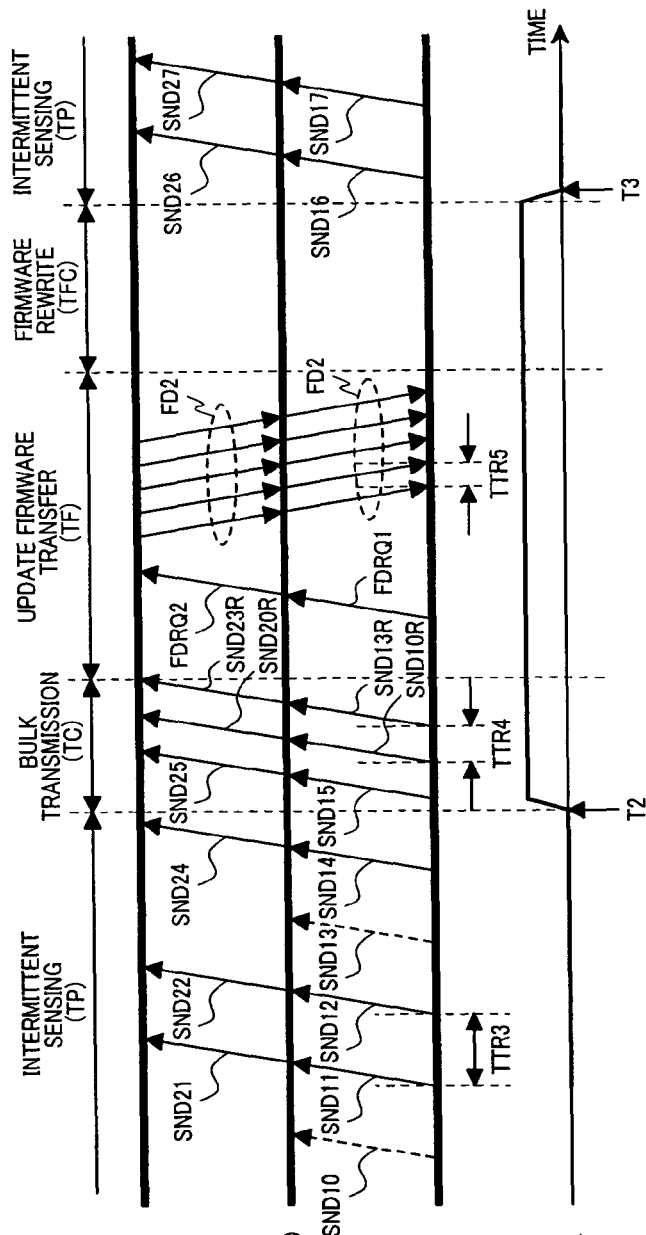

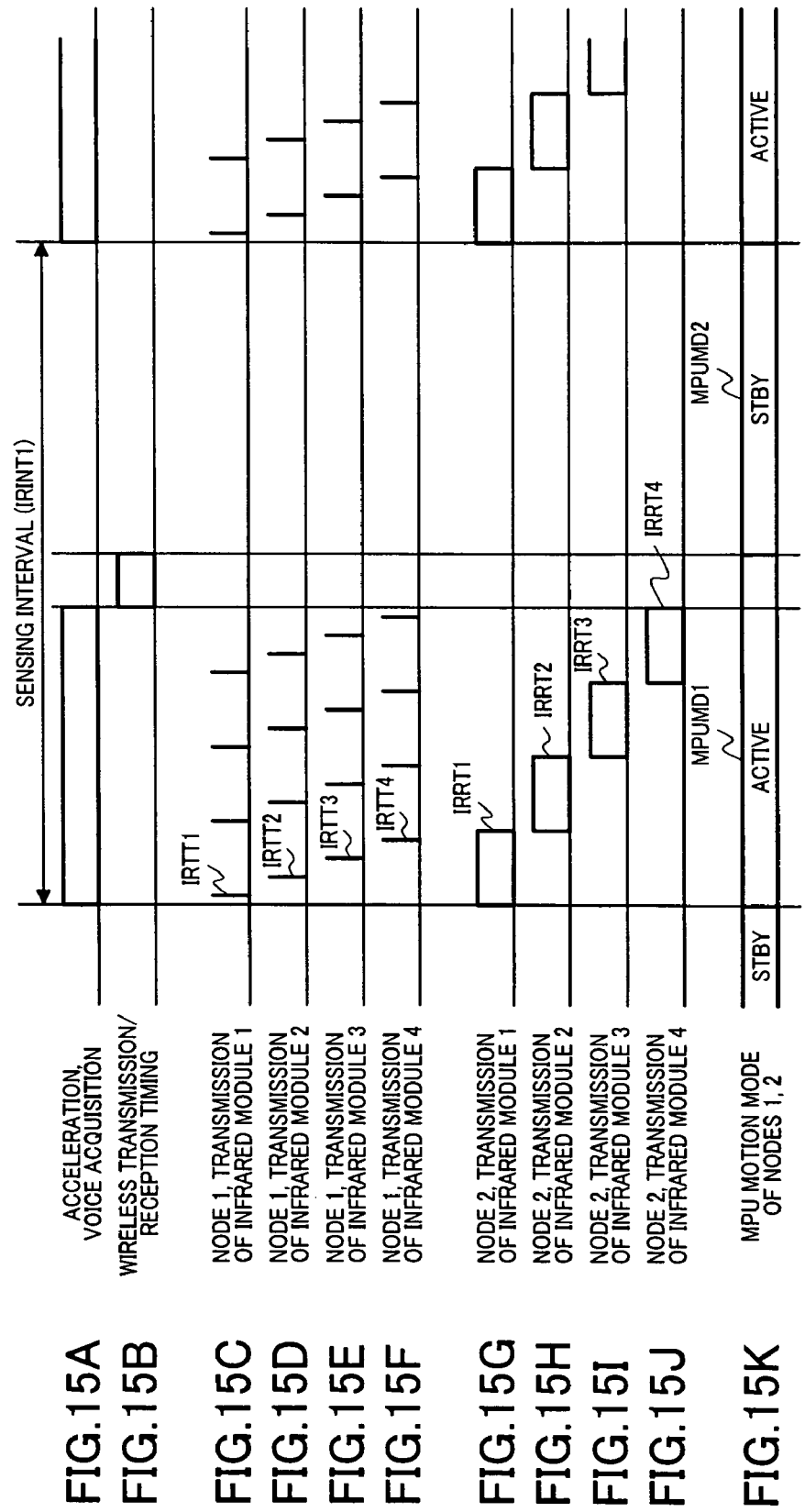

SENSOR NODE

CLAIM OF PRIORITY

The present application claims priority from Japanese patent application JP2007-143642 filed on May 30, 2007, the content of which is hereby incorporated by reference into this application.

BACKGROUND OF THE INVENTION

The present invention relates to a business microscope system for visualizing the state of an organization, and more particularly to a sensor node which is a terminal for obtaining and transmitting physical quantities in such a system.

Productivity improvement is an important issue for all kinds of organizations. Many experimental trials are taking place to improve work environments and to streamline operations. When limited to organizations such as factories involved in assembly or delivery operation, it is possible to objectively analyze the performance by pursuing the movement track of parts or products. However, with respect to white-collar organizations involved in knowledge work activities such as clerical work, sales, and planning in which goods and works are not directly connected, it is difficult to evaluate such organizations by observing goods. Primarily, the reason for forming an organization is that plural persons work together to achieve large scale operations unable to be done by an individual. Thus, decisions and agreements are typically made by two or more persons in any kind of organization. The decisions and agreements would depend on the relationship among persons, and thus the productivity would depend on its success or failure. Here, the relationship may be labeled, for example, as a manager, a subordinate, or a friend. It may also include mutual feelings such as like, dislike, confidence, or influence. Communication is a very important tool for establishing a face-to-face relationship. For this reason, the relationship could be examined by obtaining records of communications.

One method of detecting face-to-face communication uses a sensor network. The sensor network is a technology that is applied to obtain and control a state, by terminals equipped with sensors and a wireless communication circuit, which are attached to an environment, objects, persons and the like to extract various types of information from the sensors through wireless communication. Physical quantities are obtained by the sensors for detecting such communication. Examples of the physical quantity include infrared radiation for detecting face-to-face communication state, voice for detecting speech and environment, and acceleration for detecting activity and movements of a person.

The business microscope system is a system that visualizes the state of an organization by detecting the movements of persons and the face-to-face communication from the physical quantities obtained by sensors. That is, the business microscope system helps to improve the organization.

The physical quantities obtained by sensors are important for analyzing a face-to-face communication, in connection with the time at which an event occurs and its context, as well as the relationship between physical quantities obtained by different sensors. If any data goes missing, it is difficult to accurately evaluate the face-to-face communication. Thus, the data should be continuously obtained as long as the terminal is attached.

Generally, there are two major factors that cause the missing data obtained by the terminal of the sensor network. The first involves the power supply. When the battery is exhausted and changed, the power is interrupted during that time, and the physical quantities are not obtained or communicated by the sensors. The second involves the problem of communication. The distance of wireless communication is limited. If a terminal and a base station are separated at a certain distance or farther, it is difficult to communicate with each other. Also, the communicable distance is reduced under noisy environment, or by obstacles on the communication path or other problems.

Technologies have been developed to perform sensing and communication while charging a secondary battery incorporated in a terminal, for continuous acquisition and communication of sensor information, as disclosed in JP-A 2006-312010, JP-A 2004-178045, and JP-A 2004-235965.

BRIEF SUMMARY OF THE INVENTION

In the above cited JP-A 2006-312010 and 2004-178045, it is described that a terminal is generally operated by a built-in secondary battery, or operated by an external power supply when power is supplied from the outside. It is further described that the built-in secondary battery is charged in parallel while the communication operation is continued regardless of the presence or absence of the external power supply. In the cited references, when the external power supply is connected, only the destination is changed to the external power supply. The communication content and the communication frequency remain the same as in normal operation.

For example, data for rewriting the firmware of a sensor node has a size larger than that of the physical data obtained by sensors, and may not be entirely used when only partial data is missing. Transferring such data during battery operation poses problems such as wastefully consuming power and compressing communication bandwidth due to retransmission control.

The present invention aims at providing a sensor node capable of measuring physical quantities, without increasing power consumption during battery operation and without unnecessarily compressing communication bandwidth, as well as preventing missing data caused by the power supply and communication problems described above.

The business microscope is assumed to be applied to an office environment, in which physical quantities are obtained by name-tag type sensor nodes. Each name-tag type sensor node does not measure physical quantities during night hours when its wearer goes home from the office. The name-tag type sensor node operates by a built-in secondary battery when the wearer is in the office, and is attached to a cradle or connected to an external power supply to charge the secondary battery when the wearer is at home.

The inventors of the present application focused on the fact that an external power supply unit for supplying power from the outside to a name-tag type sensor node, and a base station for communicating with the name-tag type sensor node, are provided on a desk or in the vicinity thereof. Thus, the name-tag type sensor node and the base station are close to each other above the desk in which communication is stabilized. Further, during the period when the name-tag type sensor node is supplied with power from the outside, such as from a cradle attached thereto, it is very natural that the name-tag type sensor node is not worn by a person. Thus, the communication bandwidth is assumed to be unused during this period.

When the power is supplied on the desk from the outside, there is no need to consider the battery exhaustion, the communication is stabilized, and the communication bandwidth is unused. Because of these conditions, it is appropriate to transmit and receive a large amount of data, or data desired to be reliable.

The present invention is a name-tag type sensor node for obtaining face-to-face communication. When it is detected that power is supplied from the outside by connecting to an external power supply or other means on a desk, the name tag type sensor node shifts to a mode for transmitting and receiving a large amount of data by increasing the communication frequency, or a mode for transmitting and receiving data desired to be reliable.

The sensor node transfers a large amount of data or data desired to be reliable, while preventing battery exhaustion and unnecessary compression of communication bandwidth. In this way, the sensor node can transmit and receive data without missing data.

BRIEF DESCRIPTION OF THE DRAWINGS

FIGS. 1A to 1C are block diagrams showing a flow of processes in a business microscope system;

FIGS. 2A and 2B are block diagrams showing the configuration of a name-tag type sensor node which is a first embodiment, in the entire business microscope system;

FIG. 11 is a block diagram showing a specific example of the hardware configuration of the battery for cradle according to the first embodiment;

FIGS. 12A to 12F are views showing an operation sequence in which the name-tag type sensor node according to the first embodiment obtains and transmits physical quantities from sensors;

FIGS. 13A to 13D are views showing a data flow and the timing, in which data is transferred from the name-tag type sensor node according to the first embodiment, to a base station, and then transferred to a sensor net server SS;

FIGS. 15A to 15K are views showing the relationship of operation timings when plural name-tag type sensor nodes according to the first embodiment face each other.

DETAILED DESCRIPTION OF THE INVENTION

Hereinafter a preferred embodiment of the present invention will be described with reference to the accompanying drawings.

First, a business microscope system will be described to clarify the position and function of a sensor node according to the present invention. Here, business microscope is a system to observe the state of a person by a sensor node worn by the person, and display the relationship among persons as activities and evaluation (performance) of an actual organization in a picture, in order to improve the organization. The data obtained by the sensor node, such as of face-to-face communication detection, activity and movements, voice, is collectively referred to as dynamics data.

Figure 1C:
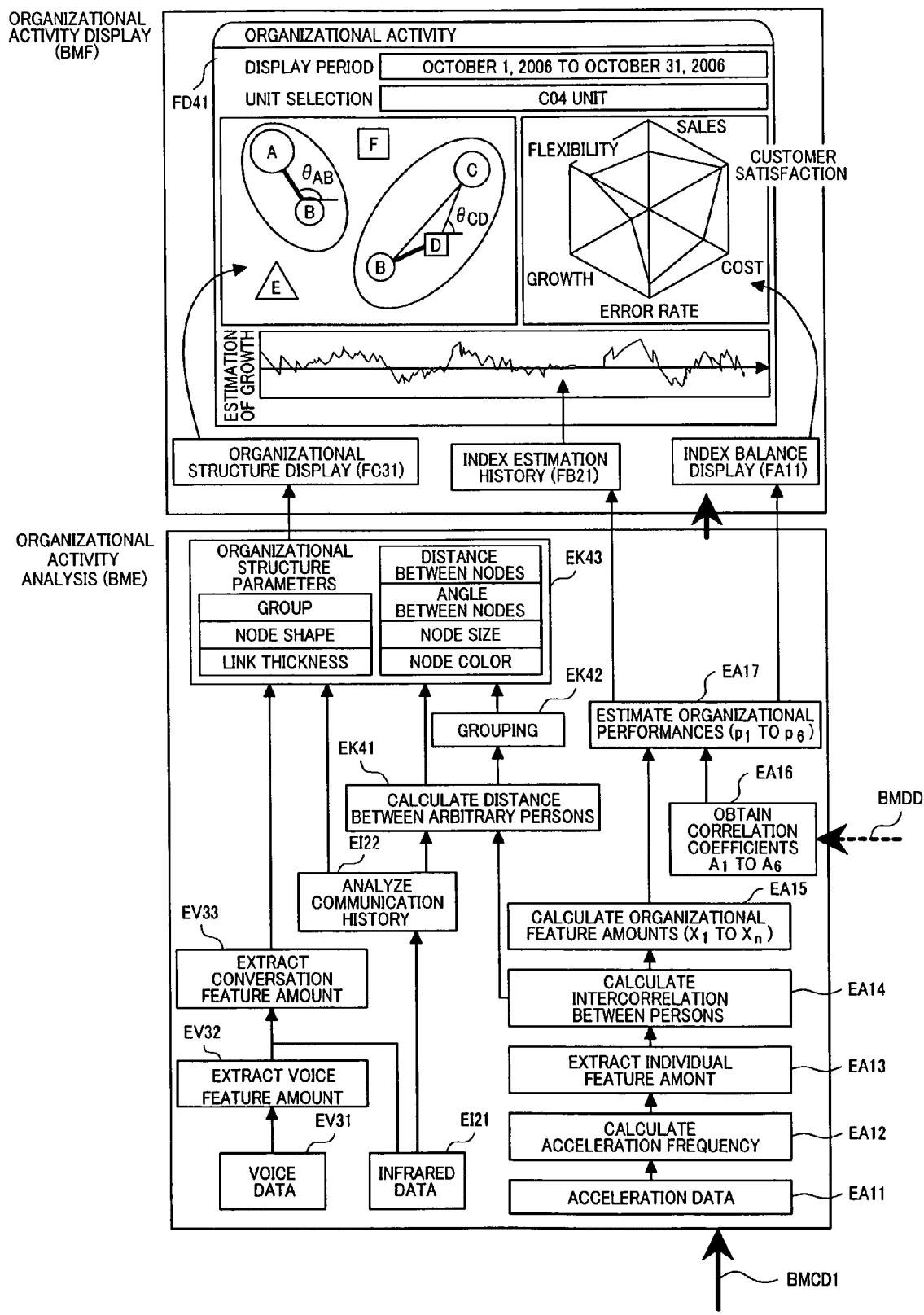

FIGS. 1A, 1B, 1C are diagrams showing the overall flow of processes performed in a business microscope system which is an embodiment of the present invention. The flow is divided into several parts for illustrative convenience, but the processes shown in the figures are performed in association with each other. Shown here is a series of flows from the acquisition of organizational dynamics data (BMA) by plural name-tag type sensor nodes (NNa to NNj) to the display (MBF) of the relationships among persons as organizational activities, together with the actual organizational evaluation (performance).

The system performs the organizational dynamics data acquisition (BMA), performance input (BMP), organizational dynamics data collection (BMB), inter-data alignment (BMC), correlation coefficient study (BMD), organizational activity analysis (BME), and organizational activity display (BMF) in an appropriate order. Incidentally, examples of devices for performing these processes, as well as the configuration of the entire system including such devices, will be described below with reference to FIGS. 2A and 2B.

First, the organizational dynamics data acquisition (BMA) will be described with reference to FIG. 1A. A name-tag type sensor node A (NNa) includes: sensors such as an acceleration sensor (ACC), an infrared transceiver (TRIR), and a microphone (MIC); an image screen (IRD) for displaying face-to-face communication information obtained by the infrared transceiver; a user interface (RTG) for inputting ratings; and a microcomputer and a wireless transmission function that are not shown in the figures.

The acceleration sensor (ACC) detects the acceleration of the name-tag type sensor node A (NNa), namely, the acceleration of a person A (not shown) wearing the name-tag type sensor node A (NNa). The infrared transceiver (TRIR) detects the facing state of the name-tag type sensor node A (NNa), namely, the state in which the name-tag type sensor node A (NNa) is facing the other name-tag type sensor node. Incidentally, the state in which the name-tag type sensor node A (NNa) is facing the other name-tag type sensor node means that the person A wearing the name-tag type sensor node A (NNa) is facing a person wearing the other name-tag type sensor node. The microphone (MIC) detects the voice around the name-tag type sensor node A (NNa).

The system of this embodiment includes plural name-tag type sensor nodes (name-tag type sensor nodes A (NNa) to J (NNj)). Each name-tag type sensor node is worn by each person. For example, the name-tag type sensor node A (NNa) is worn by the person A, the name-tag type sensor node B (NNb) is worn by a person B (not shown). This is for the analysis of the relationships among persons, as well as for the display of the performance of the organization.

Incidentally, as with the name-tag type sensor node A (NNa), the name-tag type sensor nodes B (NNb) to J (NNj) each include the sensors, microcomputer, and wireless transmission function. In the following description, when the description is given to all the name-tag type sensor nodes A (NNa) to J (NNj) and when the name-tag type sensor nodes may not be necessary to be distinguished from each other, the name-tag type sensor nodes are simply referred to as the name-tag type sensor node (NN).

The name-tag type sensor node (NN) performs sensing by the sensors constantly (or repeatedly at a short interval). Then, the name-tag type sensor node (NN) wirelessly transmits the obtained data (sensing data) at a predetermined interval. The interval at which the data is transmitted may be the same as the sensing interval, or may be larger than the sensing interval. At this time, the transmission data is added with the sensing time and the identifier (ID) unique to the sensing name-tag type sensor node (NN). The data is wirelessly transmitted in bulk to suppress power consumption, so that the name-tag type sensor node (NN) worn by a person is kept available for a long time. It is preferable that the same sensing interval is given in all the name-tag type sensor nodes (NN) for the subsequent analysis.

The performance input (BMP) is a process for inputting values indicating performance. Here, the performance means a subjective or objective evaluation that is determined based on certain criteria. For example, a person who wears the name-tag type sensor node (NN) inputs values of subjective evaluation (performance) at a predetermined timing, based on certain criteria, such as work achievement at this time, and contribution and satisfaction to the organization. The predetermined timing may be, for example, once per several hours, once a day, or the time at which an event such as a meeting is completed. The person wearing the name-tag type sensor node (NN) can input values of performance by operating the name-tag type sensor node (NN), or by operating a personal computer (PC) such as a client (CL). It is also possible to input handwritten values to the PC later at a time. This embodiment shows an example that the performance can be rated in terms of health state (Health), mental state (Mental), and motivation to study (Study). The input performance values are used for studying the correlation coefficient. Thus, when the obtained performance values are sufficient to conduct a certain degree of study, additional value is not necessarily demanded.

The performance of the organization may be calculated from the performance of an individual. The objective data such as sales or cost, as well as the data already digitized such as questionnaire results, may be periodically input as the performance. When a numerical value is automatically obtained, such as an error occurrence rate in the production management or other fields, the obtained value may be automatically input as a performance value.

The data wirelessly transmitted from each name-tag type sensor node (NN) is collected in the organizational dynamics data collection (BMB), and stored in a database. For example, a data table is generated for each name-tag type sensor node (NN), namely, for each person wearing the name-tag type sensor node (NN). The collected data is classified based on the unique ID, and stored in the data table in order of the sensing time. If the table is not generated for each name-tag type sensor node (NN), it is necessary to have a column for the ID information of the name-tag type sensor node or the person, in the data table. Incidentally, a data table A (DTBa) in FIG. 1A shows an example of a simplified data table.

Further, the performance value input in the performance input (MBP) is stored in a performance database (PDB), together with the time information.

In the inter-data alignment (BMC), data relating to arbitrary two persons is aligned based on the time information to compare the data relating to the two persons (namely, the data obtained by the name-tag type sensor nodes (NN) worn by the relevant persons). The aligned data is stored in a table. At this time, of the data relating to the two persons, the data of the same time is stored in the same record (line). The data of the same time is two data pieces including the physical quantities detected by the two name-tag type sensor nodes (NN) at the same time point. When the data relating to the two persons does not include the data of the same time, the data of the nearest time may be approximately used as the data of the same time. In this case, the data of the nearest time is stored in the same record. It is preferable that the times of the data stored in the same record are adjusted, for example, by the average value of the nearest time. Incidentally, these data pieces are not necessarily stored in the table, and may be stored in such a way that the data can be compared in chronological order.

Incidentally, a combined table (CTBab) of FIG. 1A shows an example of a simplified combination of a data table A (DTBa) and a data table B (DTBb). However, the detail of the data table B (DTBb) is not shown in the figure. The combined table (CTBab) includes the acceleration, infrared, and voice data. However, it is also possible to generate a combined table for each type of data, for example, a combined table including only the acceleration data or a combined table including only the voice data.

The content of the combined table is used as combined table data BMCD1 and BMCD2 for the organizational activity analysis (BME) and the correlation coefficient study (BMD) shown in FIGS. 1B and 1C.

In this embodiment, the correlation coefficient study (BMD) is performed in order to calculate the relationship from the organizational dynamics data and estimate the performance (FIG. 1B). First, the correlation coefficient is calculated using the data of a certain period in the past. This process may be more effective if the correlation coefficient is periodically recalculated and updated using new data.

The following description is an example of the calculation of the correlation coefficient from the acceleration data. However, the correlation coefficient can also be calculated using the time series data, such as the voice data, in place of the acceleration data by the same procedure as described below.

Incidentally, in this embodiment, the correlation coefficient study (BMD) is performed by an application server (AS) (see FIG. 2B), which will be described below. However, the correlation coefficient study (BMD) may actually be performed by a device other than the application server (AS).

First, the application server (AS) sets a width T of data used for the calculation of the correlation coefficient, in the range from several days to several weeks. The application server (AS) selects the data in this period.

Next, the application server (AS) performs an acceleration frequency calculation (BMDA). The acceleration frequency calculation (BMDA) is a process for obtaining a frequency from the acceleration data aligned in chronological order. The frequency is defined as the number of wave frequencies per second. In other words, the frequency is an index of the intensity of the frequency. However, Fourier transform is necessary for an accurate calculation of the frequency, and the amount of calculation is increased. Although the frequency may be accurately calculated using Fourier transform, this embodiment uses a zero-cross value serving as the frequency in order to simplify the calculation.

The zero-cross value is a count of the number of times the value of the time series data in the certain period is zero. More specifically, the zero-cross value is a count of the number of times the time series data changes from a positive value to a negative value or vice versa. For example, assuming that one cycle is a period of time during which the acceleration value changes from positive to negative and again from negative to positive. The frequency per second can be calculated from the counted number of zero-crosses. The frequency per second calculated as described above can be used as the approximate frequency of acceleration.

Further, the name-tag type sensor node (NN) of this embodiment is equipped with a triaxial acceleration sensor. Thus, one zero-cross value is calculated by summing the zero-cross values in three axis directions in the same period. In this way, the pendulum motion is detected in particular in the left-and-right and back-and-forth directions, able to be used as an index of the intensity of the frequency.

As the "certain period" for which the zero-cross value is calculated, a value larger than the interval of the continuous data (namely, the original sensing interval) is set in the unit of second or minute.

Further, the application server (AS) sets a window width w, which is a time width larger than the zero-cross value and smaller than the entire data width T. In the next step, the frequency distribution and fluctuation are obtained in this window. Then, the frequency distribution and fluctuation are calculated for each window by moving the windows sequentially along the time axis.

At this time, when the window is moved across the same width as the window width w, there is no data overlap between the windows. As a result, a feature amount graph used in the subsequent correlation coefficient calculation (BMDC) is a discrete graph. Whereas when the window is moved in a width smaller than the window width w, parts of the data in the windows overlap. As a result, the feature amount graph used for the subsequent correlation coefficient calculation (BMDC) is a continuous graph. The width by which the window is moved may be set to an arbitrary value, by considering the fact as described above.

Incidentally, in FIG. 1B, the zero-cross value is also referred to as frequency. In the following description, the term "frequency" is the concept including the zero-cross value. In other words, in the following description, the term "frequency" may be applied to the accurate frequency calculated by Fourier transform, or to the approximate frequency calculated from the zero-cross value.

Next, the application server (AS) performs an individual feature amount extraction (BMDB). The individual feature amount extraction (BMDB) is a process for extracting the feature amount of an individual by calculating the frequency distribution and frequency fluctuation of the acceleration in each window.

First, the application server (AS) obtains the frequency distribution (namely, the intensity) (DB12).

In this embodiment, the frequency distribution is a frequency at which the acceleration of each frequency occurs.

The frequency distribution of the acceleration reflects what a person wearing the name-tag type sensor node (NN) does and how long it takes. For example, the frequency of the acceleration is different between when the person is walking and when writing e-mail by a PC. In order to record a histogram of such an acceleration history, the occurrence frequency of the acceleration is obtained for each frequency.

At this time, the application server (AS) determines the frequency assumed (or desired) to be maximum. Then the application server (AS) divides the value from 0 to the determined maximum value, into 32 segments. Then the application server (AS) counts the number of acceleration data included in each of the divided frequency ranges. In this way, the occurrence frequency of the acceleration is calculated for each frequency, and is treated as the feature amount. The same process is performed for each window.

The application server (AS) calculates the "fluctuation for each frequency" (DB11), in addition to the frequency distribution of the acceleration. The fluctuation of frequency is the value indicating how long the frequency of the acceleration is continuously maintained.

The fluctuation for each frequency is an index of how long the activity of a person is maintained. For example, suppose a person walks for 30 minutes in an hour. The meaning of the activity is different between the case where the person repeats a one minute walk and a one-minute stop and the case where the person continues to walk for 30 minutes after a 30-minute break. These activities can be distinguished by calculating the fluctuation for each frequency.

However, the magnitude of fluctuation largely changes depending on the setting of criteria, namely, the range of differences between two continuous values in which it is determined that the value of the acceleration frequency is maintained. Further, information about the dynamics of data, such as whether the value changes a little or a lot, could be missing. For this reason, in this embodiment, the entire range of the acceleration frequency is divided into a predetermined division number. Here, the entire range of the frequency corresponds to the range from the frequency "0" to the maximum value of the frequency (see Step DB12). The divided segments are used as the criteria for determination whether the value is maintained or not. For example, when the division number is 32, the entire range of the frequency is divided into 32 segments.

For example, when the acceleration frequency at a certain time t is in the ith segment and the acceleration frequency at the next time t+1 is in the (i−1)th, ith, or (i+1)th segment, it is determined that the value of the acceleration frequency is maintained. On the other hand, when the acceleration frequency at the time t+1 is not in the (i−1)th, ith, or (i+1)th segment, it is determined that the value of the acceleration frequency is not maintained. The number of times of determining that the value is maintained is counted as the feature amount of the fluctuation. The above process is performed for each window.

Similarly, the feature amounts of the fluctuation with the division numbers 16, 8, and 4 are calculated, respectively. In this way, by changing the division number in the calculation of the fluctuation for each frequency, both small and large changes can be reflected in any of the feature amounts.

If the entire range of the frequency is divided into 32 segments to pursue the transition of a certain frequency from a segment i to an arbitrary segment j, 1024 types (the square of 32) of transition patterns should be considered. As a result, the calculation amount increases as the number of patterns increases. In addition to this problem, the error is statistically significant because the amount of data corresponding to one pattern is reduced.

While on the other hand, when the feature amount is calculated with the division numbers 32, 16, 8, and 4 as described above, only 60 patterns should be considered. As a result, the statistical reliability is increased. Another advantage is that, by calculating the feature amount for several division numbers from large to small, various transition patterns can be reflected in the feature amounts.

The above description has focused on the example of calculating the frequency distribution and fluctuation of the acceleration. The application server (AS) can perform the same process as described above for other data (for example, the voice data) than the acceleration data. As a result, the feature amount is calculated based on the obtained data.

As described above, the application server (AS) calculates 32 patterns of the frequency distribution and 60 patterns of the fluctuation magnitude for each frequency, or 92 values in total. The application server (AS) treats the values as the feature amounts of the person A in the windows in the time frame (DB13). Incidentally, the 92 feature amounts ($X_{A1}$ to $X_{A92}$) are all independent.

The application server (AS) calculates the above feature amounts based on the data transmitted from the name-tag type sensor nodes (NN) of all the members belonging to the organization (or all the members desired to be analyzed). Since the feature amounts are calculated for each window, the feature amounts for one member can be treated as a time series data by plotting the feature amounts in order of the time of the window. Incidentally, the time of the window can be determined according to an arbitrary rule. For example, the time of the window may be the time at the center of the window, or may be the time at the beginning of the window.

The feature amounts ($X_{A1}$ to $X_{A92}$) are the feature amounts for the person A, which are calculated based on the acceleration detected by the name-tag type sensor node (NN) worn by the person A. Similarly, feature amounts (for example, $X_{B1}$ to $x_{B92}$) for the other person (for example, person B) are calculated based on the acceleration detected by the name-tag type sensor node (NN) worn by the person B.

Next, the application server (AS) performs an intercorrelation calculation (BMDC). The intercorrelation calculation (BMDC) is a process for obtaining the intercorrelation of the feature amounts for two persons. Suppose the two persons are person A and person B.

A feature amount $x_A$ shown in the intercorrelation calculation (BMDC) of FIG. 1B is a graph plotting the time-series change of the feature amount of the person A. Similarly, a feature amount $x_B$ shown in the intercorrelation calculation (BMDC) is a graph of the feature amount of the person B.

At this time, the influence of the feature amount (for example, $x_{A1}$) of the person A on the feature amount (for example, $x_{B1}$) of the person B, is expressed as the function of time τ:

[Formula 1] (1)

$$R(\tau) = \frac{1}{T'} \cdot \frac{\int_0^{T'} \{x_A(t) - \overline{x_A}\}\{x_B(t) - \overline{x_B}\} dt}{\sqrt{\int_0^{T'} \{x_A(t) - \overline{x_A}\}^2 dt} \sqrt{\int_0^{T'} \{x_B(t) - \overline{x_B}\}^2 dt}}$$

$$\begin{pmatrix} T' = T - \tau \\ \tau = -T \sim T \end{pmatrix}$$

where, $x_{A1}(t)$: the value of the feature amount $x_1$ of the person A at the time t $\overline{x_{A1}}$: the average value of the feature amount $x_1$ of the person A in the time range of 0 to T The same calculation can be applied to the person B. Here, T is the time width in which the data of the frequency exists.

That is, in the above formula, when $R(\tau)$ is peaked with $\tau = \tau_1$, the activity of the person B at a certain time is likely to be similar to the activity of the person A done before $\tau_1$ from that time. In other words, the feature amount $x_{B1}$ of the person B is influenced after the time $\tau_1$ has passed from the occurrence of the activity of the feature amount $x_{A1}$ in the person A.

It is possible to understand that the value τ, at which the peak appears, represents a type of the influence. For example, it could be said that τ of less than a few seconds indicates the influence of a face-to-face communication such as nodding, whereas τ of several minutes to several hours indicates the influence of an activity.

The application server (AS) applies the procedure of the intercorrelation calculation to 92 patterns which is the number of the feature amounts of the person A and the person B. Further, the application server (AS) calculates the feature amounts for each pair of the members belonging to the organization (or the members desired to be analyzed), by the above described procedure.

The application server (AS) obtains plural feature amounts of the organization, from the results obtained by the intercorrelation calculation relating to the feature amounts. For example, the time domain is divided into several periods, such as within an hour, within a day, and within a week. The values for each pair of persons are treated as the feature amounts (BMDD). Then, the constants are determined as the feature amounts from the results of the intercorrelation calculation. At this time, it is also possible to use a method other than the method described above. In this way, one organizational feature amount is obtained from one intercorrelation calculation. When the number of individual feature amounts is 92, the square of 92 for each pair, namely, 8464 organizational feature amounts can be obtained. The intercorrelation reflects the influence and relationship of the two members belonging to the organization. For this reason, by using the values obtained by the intercorrelation calculations as the feature amounts of the organization, it is possible to treat the organization, which is realized through human relationship, in a quantitative manner.

The application server (AS) obtains the data of quantitative evaluation of the organization (hereinafter referred to as performances) from the performance database (PDB) as PDBD shown in FIG. 1A (BMDE). As described below, the correlations between the organizational feature amounts and the performances are calculated. The performances may be calculated, for example, from the achievements of an individual that each person declared, or the results of subjective evaluation relating to human relationships and the like in the organization. It is also possible to use the financial evaluation of the organization, such as sales and loss, as the performances. The performances are obtained from the performance database (PDB) of the organizational dynamics data collection (BMB), and processed together with the time information at which the performances were evaluated. Here, the description will be made on an example of using six indexes ($p_1$ to $p_6$), such as sales, customer satisfaction, cost, error rate, growth, and flexibility, as the performances of the organization.

Next, the application server (AS) performs correlation analysis between the organizational feature amounts and each of the organizational performances (BMDF). However, the organizational feature amounts are enormous and include unnecessary feature amounts. Thus, the application server (AS) selects only effective feature amounts by a stepwise method (BMDG). The application server (AS) may also use a method other than the stepwise method for the selection of the feature amounts.

Then, in the relationship between the selected organizational feature amounts ($X_1$ to $X_m$) and each organizational performance, the application server (AS) determines a correlation coefficient $A_1$ ($a_1$ to $a_m$) satisfying the following formula:

[Formula 2]

$$p_1 = a_1 X_1 + a_2 X_2 + \ldots + a_m X_m \quad (2)$$

Incidentally, m is 92 in the example of FIG. 1B. This is performed for $p_1$ to $p_6$ to determine $A_1$ to $A_6$ for $p_1$ to $p_6$, respectively. Here, the simplest linear modeling is done. However, values $X_1$, $X_2$ and so on determined by the nonlinear mode, may be adopted in order to increase the accuracy. It is also possible to use a method such as a neural network.

Next, using the correlation coefficients $A_1$ to $A_6$, the six performances are estimated from the acceleration data.

The organizational activity analysis (BME) shown in FIG. 1C is a process for obtaining a relationship between arbitrary two persons in the combined table, from the data such as the acceleration, voice, and face-to-face communication, and then calculating the performances of the organization.

In this way, it is possible to estimate the performances of the organization in real time while obtaining data, and to present the estimation to the user. If the estimation is unfavorable, it is possible to encourage the user to change the behavior toward a positive direction. In other words, it is possible to provide feedback at a short cycle.

First, the calculation using the acceleration data will be described. The procedures of acceleration frequency calculation (EA12), individual feature amount extraction (EA13), intercorrelation calculation between persons (EA14), and organizational feature amount calculation (EA15) are the same as those of the acceleration frequency calculation (BMDA), individual feature amount extraction (BMDB), intercorrelation calculation (BMDC), and organizational feature amount calculation (BMDD) in the correlation coefficient study (BMD). Thus, their description will be omitted. The organizational feature amounts ($x_1$ to $x_m$) are calculated by these procedures.

Then, the application server (AS) obtains the organizational feature amounts ($x_1$ to $x_m$) calculated in Step EA15, and obtains the correlation coefficients ($A_1$ to $A_6$) for the respective performances calculated by the correlation coefficient study (BMD) as BMDD shown in FIG. 1B (EA16). Then, using the obtained parameters, the application server (AS) calculates the value of the index of each performance:

[Formula 3]

$$p_1 = a_1 x_1 + a_2 x_2 + \ldots + a_m x_m \quad (3)$$

This value is an estimation of the organizational performance (EA17).

As described below, the latest values of the six indexes of the organizational performances are balanced and displayed. Further, the history of the value of one index is displayed as an index estimation history in a time-series graph.

The distance between arbitrary persons, which is obtained from the value of the intercorrelation between the persons (EK41), is used for determining a parameter (organizational structure parameter) to display the organizational structure. Here, the distance between the persons is an index of the relationship between the persons, and not the geographic distance. For example, the stronger the relationship between the persons is (for example, the stronger the intercorrelation between the persons), the shorter the distance therebetween is. Further, grouping is performed based on their distance between the persons (EK42) to determine a group in the display.

The grouping is a process for generating pairs of persons having close relationships with each other. That is, a pair of at least two persons A and B particularly having a close relationship is defined as one group. A pair of at least two persons C and D having another close relationship is defined as one group. Then, a group of these persons A, B, C, and D is defined as a large group.

Next, the calculation based on the infrared data will be described. The infrared data includes information about who meets who and when it occurs. The application server (AS) analyzes the face-to-face communication history by the infrared data (EI22). Then the application server (AS) defines parameters for displaying the organizational structure based on the face-to-face communication history (EK43). At this time, it is also possible that the application server (AS) calculates the distance between arbitrary persons from the face-to-face communication history, and defines a parameter based on the calculated distance. For example, the distance between the persons is calculated to be shorter (namely, their relationship is stronger) as the number of their face-to-face communications is increased in a predetermined period.

For example, the application server (AS) may determine the parameters, in such a way that the total number of face-to-face communications in one person is reflected in the size of the node, the number of short-term face-to-face communications among persons is reflected in the distance among nodes, and the number of long-term face-to-face communications between arbitrary persons is reflected in the thickness of the link. Here, the node is an image displayed to indicate each person on a display (CLOD) of the client (CL). The link is a line connecting two nodes. As a result, the displayed node is larger as the relevant person has communicated face-to-face with many persons until now, regardless of who they are. The two nodes are positioned closer to each other as the relevant two persons have frequently communicated face-to-face in recent days. The two nodes are connected by a thicker link as the relevant two persons have communicated face-to-face for a long time.

Further, the application server (AS) can reflect the attribute information of a user wearing the name-tag type sensor node, in the display of the organizational structure. For example, the color of the node indicating a person may be determined by the age of the person. Also, the shape of the node may be determined according to the title of the position.

Next, the calculation based on the voice data will be described. As with the case of using the acceleration data described above, the intercorrelation between persons can be calculated using the voice data in place of the acceleration data. However, it is also possible to extract a conversation feature amount (EV33) by extracting a voice feature amount from the voice data (EV32) and by analyzing the extracted feature amount together with the communication data. The conversation feature amount is an amount indicating, for example, tone of voice in conversation, rhythm of dialogue, or conversation balance. The conversation balance is an amount indicating whether one of two persons monopolizes the conversation or the two persons share the conversation. The conversation balance is extracted based on the voices of the two persons.

For example, the application server (AS) may determine a parameter of the display so that the conversation balance is reflected in the angle between the nodes. More specifically, for example, when two persons share the conversation, the nodes indicating the persons may be displayed in parallel. When one of the two persons monopolizes the conversation, the node indicating the talking person may be displayed above the node of the other person. It is also possible to display so that the stronger the tendency that one person monopolizes the conversation, the larger the angle between a line connecting the nodes indicating the two persons and a reference line (namely, an angle $\theta_{AB}$ or $\theta_{CD}$ in the example of the organizational structure display (FC31) in FIG. 1C). Here, the reference line is, for example, a line provided in the lateral direction of the display (namely, in the horizontal direction). The reference line may not be displayed on the display.

The organizational activity display (BMF) is a process for generating an index balance display (FA11), index estimation history (FB21), and organizational structure display (FC31)

and the like, from the organizational performance estimation and organizational structure parameters calculated by the above described processes. The generated data is displayed on the display (CLOD) of the client (CL), or other display means.

An organizational activity (FD41) of FIG. 1C is an example of an image displayed on the display (CLOD) of the client (CL).

In the example of FIG. 1C, the selected display period, and the unit desired to be displayed or plural members are first displayed. Here, the unit is an organization having plural members. There may be displayed all the members belonging to one unit, or plural members who are a part of the unit. In the example of FIG. 1C, the results of the analysis based on the conditions such as the display period and the unit are displayed as three different images.

The image of the index estimation history (FB21) is an example of an estimation result history on the performance of "growth". This makes it possible to analyze what activity of the member benefits the organization, and what is effective to turn from negative to positive, by comparing to the past activity history.

The organizational structure display (FC31) visualizes the states of the small groups that constitute the organization, the role that each member actually has in the organization, the balance between arbitrary members, and the like.

The index balance display (FA11) shows the balance of the estimation of the specified six organizational performances. This makes it possible to figure out the strengths and weaknesses of the actual organization.

<Overall Configuration of the Business Microscope System>

Figure 2B:
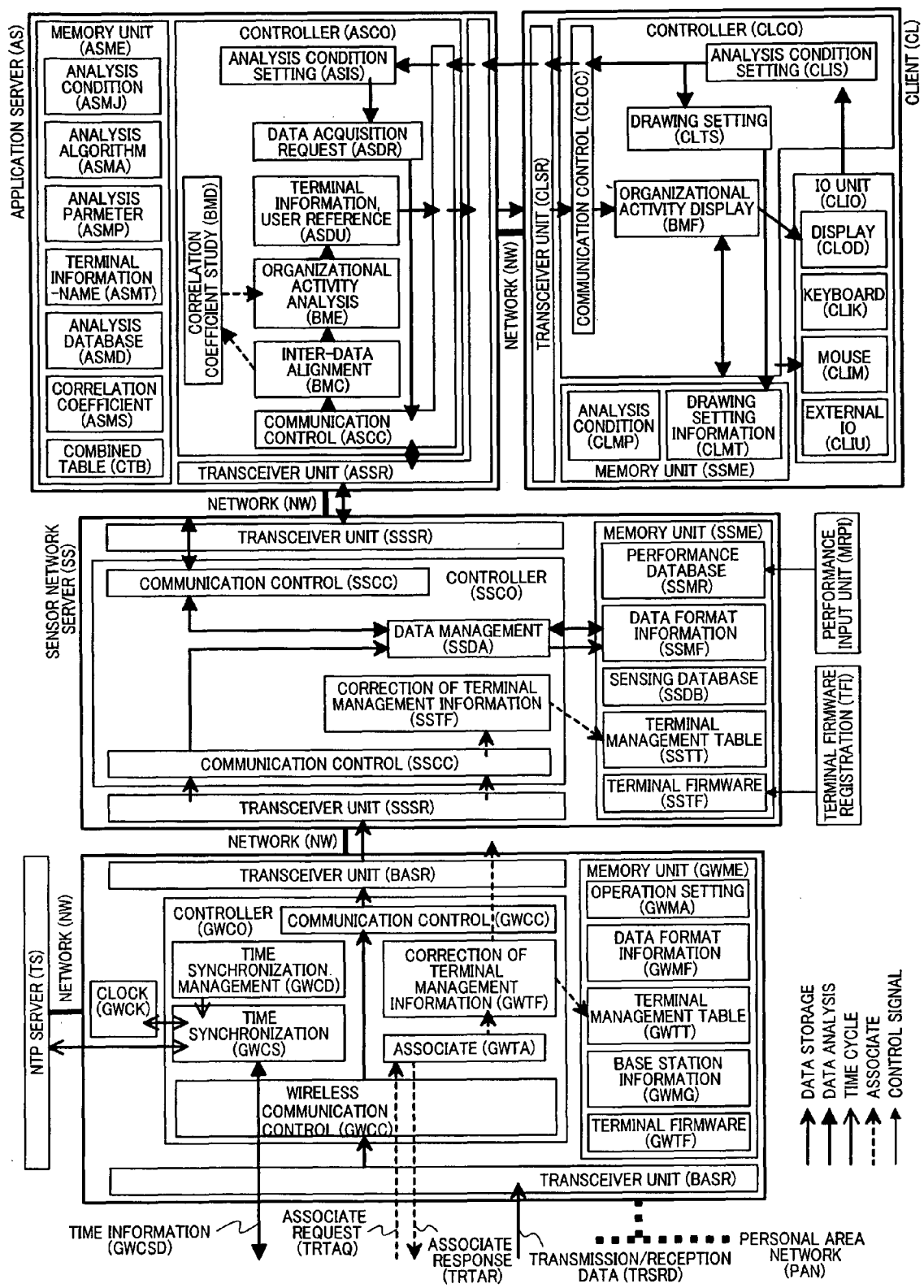

Next, the hardware configuration of the business microscope system of this embodiment will be described with reference to FIGS. 2A, 2B. FIGS. 2A, 2B are block diagrams showing the overall configuration of a sensor network system that realizes the business microscope system. The five arrows of different shape in FIGS. 2A, 2B indicate the time synchronization, associate, storage of obtained sensing data, data flow for data analysis, and control signal.

The business microscope system includes a name-tag sensor node (NN), a base station (GW), a sensor network server (SS), an application server (AS), and a client (CL). Each of the functions is realized by hardware, software, or the combination thereof. The function block is not necessarily associated with a hardware entity.

FIG. 2A shows the configuration of the name-tag type sensor node (NN) which is an example of a sensor node. The name-tag type sensor node (NN) is equipped with various sensors, including plural infrared transceivers (TRIR1 to TRIR4) for detecting the face-to-face communication state; a triaxial acceleration sensor (ACC) for detecting the activity of a wearer, a microphone (MIC) for detecting the speech of the wearer as well as the sound around the wearer, luminance sensors (LS1F, LS1B) for detecting the back and front of the name-tag type sensor node, and a temperature sensor (THM). It should be understood that these sensors are examples and other sensors may be used for detecting the face-to-face communication state and activity of the wearer.

In this example, the name-tag type sensor node (NN) includes four infrared transceivers. The infrared transceivers (TRIR1 to TRIR4) continue to periodically transmit terminal information (TRMD) which is the unique identification information of the name-tag type sensor node (NN), in the front direction. When a person wearing the other name-tag type sensor node (NNm) is positioned substantially in front (for example, in front or diagonally in front), the name-tag type sensor node (NN) and the other name-tag type sensor node (NNm) exchange their terminal information (TRMD) by infrared radiation.

Thus, it is possible to record who meets who.

Each infrared transceiver is generally formed by a combination of an infrared emitting diode for infrared transmission, and an infrared phototransistor. An infrared ID transmitter IrID generates its own ID, TRMD, and transfers to the infrared emitting diode of the infrared transceiver module. In this example, the same data is transmitted to plural infrared transceiver modules, and then all the infrared emitting diodes are lighted at the same time. Of course, it is also possible to output independent timings and different data, respectively.

Further, the data received by the infrared phototransistors of the infrared transceivers TRIR1 to TRIR4, is ORed by a logical sum circuit (IROR). In other words, when the ID is received by at least one of the infrared receivers, it is recognized by the name-tag type sensor node as an ID. Of course, it is also possible to have plural ID receiving circuits independently. In this case, the transmission and reception state can be provided for each of the infrared transceiver modules. For example, it is possible to obtain additional information about the direction of the other facing name-tag type sensor node.

Physical quantity data SENSD detected by the sensors is stored in a memory unit STRG by a sensor data storage controller (SDCNT). The physical quantity data is converted to a transmission packet by a wireless communication controller TRCC, and is transmitted to the base station GW by a transceiver unit TRSR.

At this time, a communication timing controller TRTMG generates a timing for extracting the physical quantity data SENSD from the memory unit STRG and wirelessly transmitting the data. The communication timing controller TRTMG has plural time bases to generate plural timings.

Examples of the data stored in the memory unit are a past-accumulated physical quantity CMBD, and data FMUD for updating the firmware which is an operation program of the name-tag type sensor node, in addition to the physical quantity data SENSD currently detected by the sensors.

The name-tag type sensor node (NN) of this example detects the connection of an external power supply (EPOW) by an external power detection circuit (PDET), and generates an external power detection signal (PDETS). The external power detection signal (PDETS) is used in a time base selector (TMGSEL) to switch the transmission timing generated by the timing controller (TRTMG). The external power detection signal (PDETS) is also used in a data selector (TRDSEL) to switch the data to be wirelessly transmitted. This configuration is specific to this example. FIG. 2A shows an example of the configuration in which the time base selector TMGSEL switches the transmission timing between a time base 1 (TB1) and a time base 2 (TB2) by the external power detection signal PDETS, and in which the data selector TRDSEL switches the data to be communicated among the physical quantity data SENDSD obtained by the sensors, the past-accumulated physical quantity data CMBD, and the firmware update data FIRMUPD, by the external power detection signal PDETS.

The luminance sensors (LS1F, LS1B) are mounted on the front and back of the name-tag type sensor node (NN), respectively. The data obtained by the luminance sensors LS1F and LS1B is stored in the memory unit STRG by a sensor data storage controller SDCNT. At the same time, the obtained data is compared by a reverse detection unit (FBDET). When the name tag is properly worn, the front luminance sensor LS1F receives incoming light. The back luminance sensor LS1B is positioned between the main body of the name-tag type sensor node and the wearer, receiving no incoming light. At this time, the luminance detected by LS1F is larger than the luminance detected by LS1B. On the other hand, when the name-tag type sensor node is reversed, LS1B receives incoming light. At this time, the luminance detected by LS1B is larger than the luminance detected by LS1F facing the wearer's side because LS1F faces the wearer.

Here, the luminance detected by LS1F and the luminance detected by LS1B are compared by the reverse detection unit FBDET in order to detect that the name-tag type sensor node is reversed and incorrectly worn. When a reverse is detected by FBDET, a speaker SP generates a warning sound to notify the wearer.

The microphone (MIC) obtains voice information. From the voice information it is possible to know, for example, that the surrounding environment is "noisy" or "quiet". Further, by obtaining and analyzing the voices of persons, it is possible to analyze the face-to-face communication, such as whether the communication is active or inactive, the conversation is monopolized or shared, and the speakers are angry or smile. Further, even if the infrared transceivers TRIR do not detect the face-to-face communication state due to the standing positions of the persons or other reasons, it is possible to compensate by the voice information and the acceleration information.

The voice obtained from the microphone MIC is provided as a voice waveform and as a signal integrated by an integrating circuit AVG. The integrated signal represents the energy of the obtained voice.

The triaxial acceleration sensor (ACC) detects the acceleration of the node, namely, the movement of the node. Thus, it is possible to analyze the intensity of the activity of the person wearing the name-tag type sensor node, as well as the action such as walking, from the acceleration data. Further, by comparing the acceleration values detected by plural name-tag type sensor nodes, it is possible to analyze the activation level of the communication between the persons wearing the name-tag type sensor nodes, the mutual rhythm, and the inter-correlation or other data.

In the name-tag type sensor node of this example, the data obtained by the triaxial acceleration sensor ACC is stored in the memory unit STRG by the sensor data storage controller SDCNT. At the same time, the orientation of the name tag is detected by an up/down detection circuit UDDET. This uses the fact that the triaxial acceleration sensor detects two types of acceleration, which are observed as dynamic acceleration change in the wearer's movement and as static acceleration of the Earth's gravity.

The display device LCDD displays the personal information such as the department and name of the wearer when wearing the name-tag type sensor node on the chest. In other words, the name-tag type sensor node acts as a name tag. On the other hand, when the wearer holds the name-tag type sensor node in the hand and turns the display device LCDD toward the wearer, the name-tag type sensor node is upside down. At this time, the content displayed on the display device LCDD, as well as the button function are switched by an up/down detection signal UDDETS generated by the up/down detection circuit UDDET. In this example, the information displayed on the display device LCDD is switched between the analysis results of the infrared activity analysis (ANA) that is generated by a display controller DISP, and the name tag display DNM, based on the value of the un/down detection signal UDDETS.

The infrared radiation is exchanged between the nodes by their transceivers (TRIR), in order to detect whether the name-tag type sensor node is facing the other name-tag type sensor node, namely, whether a person wearing the name-tag type sensor node is facing a person wearing the other name-tag type sensor node. Thus, it is preferable that the name-tag type sensor nodes are worn in the front portion of the persons. As described above, the name-tag type sensor node further includes the sensor such as the acceleration sensor (ACC). The process of sensing in the name-tag type sensor node corresponds to the organizational dynamics data acquisition (BMA) in FIG. 1A.

There are often plural name-tag type sensor nodes, each connected to each nearby base station (GW) to form a personal area network (PAN).

The temperature sensor (THM) of the name-tag type sensor node (NN) obtains temperature of the location of the name-tag type sensor node. The luminance sensor (LS1F) obtains luminance in the front direction or other direction of the name-tag type sensor node (NN). In this way, it is possible to record the surrounding environment. For example, the movement of the name-tag type sensor node (NN) from a certain place to another place can be found based on the temperature and the luminance.

The name-tag type sensor node includes buttons 1 to 3 (BTN1 to BTN3), display device (LCDD), speaker (SP) and the like, as an input/output device for the wearer.

The memory unit (STRG) includes, in particular, a hard disc, and a nonvolatile memory device such as a flash memory. The memory unit (STRG) stores terminal information (TRMT) which is the unique identification number of the name-tag type sensor node (NN), interval of sensing, and operation setting (TRMA) such as the content output to the display. In addition, the memory unit (STRG) can temporarily store data, and is used for storing the sensing data.

The communication timing controller (TRTMG) is a clock for maintaining time information and updating the time information at a predetermined interval. The time information is periodically corrected by time information GWCSD transmitted from the base station (GW), in order to prevent the time lag between the time information and that of the other name-tag type sensor node.

The sensor data storage controller (SDCNT) manages the obtained data by controlling the sensing interval and the like of the sensors according to the operation setting (TRMA) stored in the memory unit (STRG).

The time synchronization obtains the time information from the base station (GW) and corrects the clock. The time synchronization may be performed immediately after an associate operation described below, or may be performed in response to a time synchronization command transmitted from the base station (GW).

The wireless communication controller (TRCC) is involved in the data transmission and reception, controlling the transmission interval and converting the data into a data format appropriate for wireless transmission and reception. The wireless communication controller (TRCC) may include a wired communication function instead of wireless, if necessary. The wireless communication controller (TRCC) sometimes performs congestion control so that the transmission timing does not overlap with the transmission timing of the other name-tag type sensor node (NN).

The associate (TRTA) transmits a request TRTAQ to form a personal network area (PAN) with the base station (GW) shown in FIG. 2B, and receives a response TRTAR to the request. Thus, the base station (GW) to which the data should be transmitted is determined. The associate (TRTA) is performed when the power of the name-tag type sensor node (NN) is turned on, and when the transmission/reception with the base station (GW) is stopped due to movement of the name-tag type sensor node (NN). As a result of the associate (TRTA), the name-tag type sensor node (NN) is associated with the base station (GW) located nearby so that the wireless signal reaches from the name-tag type sensor node (NN).

The transceiver unit (TRSR) includes an antenna to transmit and receive wireless signals. The transceiver unit (TRSR) can also transmit and receive using a connector for wired communication, if necessary. The data TRSRD is transmitted and received between the transceiver unit TRSR and the base station (GW) through the personal area network (PAN).

The base station (GW) shown in FIG. 2B has a function of intermediating between the name-tag type sensor node (NN) and the sensor network server (SS). By considering the wireless range, plural base stations (GW) are provided so as to cover areas such as living room and work place.

The base station (GW) includes a transceiver unit (BASR), a memory unit (GWME), a clock (GWCK), and a controller (GWCO).

The transceiver unit (BASR) receives wireless signals from the name-tag type sensor node (NN), and performs wired or wireless transmission to the base station (GW). Further, the transceiver unit (BASR) includes an antenna for receiving wireless signals.

The memory unit (GWME) includes a hard disc, and a nonvolatile memory device such as a flash memory. The memory unit (GWME) stores at least operation setting (GWMA), data format information (GWMF), terminal management table (GWTT), and base station information (GWMG). The operation setting (GWMA) includes the information about the operation method of the base station (GW). The data format information (GWMF) includes the information about the data format for data communication as well as the information about the tag to be added to the sensor data. The terminal management table (GWTT) includes the terminal information (TRMT) of the children name-tag type sensor nodes (NN) in which the association is actually established, and the local IDs provided to manage the name-tag type sensor nodes (NN). The base station information (GWMG) includes the information such as the address of the own base station (GW). Further, the memory unit (GWME) temporarily stores the updated firmware (GWTF) of the name-tag type sensor node.

The memory unit (GMWE) may also store programs to be executed by a central processing unit CPU (not shown) within the controller (GWCO).

The clock (GWCK) maintains time information. The time information is updated at a predetermined interval. More specifically, the time information of the clock (GWCK) is corrected by the time information obtained from an NTP (Network Time Protocol) server at a predetermined interval.

The controller (GWCO) includes the CPU (not shown). The CPU executes the programs stored in the memory unit (GWME) to manage the acquisition timing of sensing data sensor information, the processing of the sensor data, the transmission/reception timing to the name-tag type sensor node (NN) as well as the sensor network server (SS), and the time synchronization timing. More specifically, the CPU executes the programs stored in the memory unit (GWME) to perform the processes of wireless communication control/communication control (GWCC), data format conversion (GWDF), associate (GWTA), and time synchronization management (GWCD).

The wireless communication control/communication control (GWCC) controls the timing of wireless or wired communication with the name-tag type sensor node (NN) and the sensor network server (SS). Further, the wireless communication control/communication control (GWCC) classifies the type of received data. More specifically, the wireless communication control/communication control (GWCC) identifies whether the received data is general sensing data, data for an association operation, or a response of the time synchronization or others, from the header portion of the data. Then the wireless communication control/communication control (GWCC) passes these data pieces to the appropriate functions, respectively.

Incidentally, the wireless communication control/communication control (GWCC) performs the data format conversion (GWDF). More specifically, the wireless communication control/communication control (GWCC) refers to the data format information (GWMF) stored in the memory unit (GWME), converts the data to an appropriate format for transmission/reception, and adds the tag information for indicating the type of the data.

The associate (GWTA) transmits the response TRTAR to the associate request TRTAQ transmitted from the name-tag type sensor node (NN), and transmits the local ID assigned to the name-tag type sensor node (NN). Once an association is established, the associate (GWTA) performs a terminal management information correction (GWTF) to correct the terminal management table (GWTT).

The time synchronization management (GWCD) controls the interval and timing at which the time synchronization is performed, and issues an instruction to perform the time synchronization. It is also possible that the sensor network server (SS) performs the time synchronization management (GWCD) and transmits the instruction to all the base stations (GW) in the system, which will be described below.

The time synchronization (GWCS) is connected to the NTP server (TS) on the network to request and obtain time information. The time synchronization (GWCS) corrects the clock (GWCK) based on the obtained time information. Then, the time synchronization (GWCS) transmits the time synchronization instruction and the time information (GWCSD), to the name-tag type sensor node (NN).

The sensor network server (SS) of FIG. 2B manages the data collected from all the name-tag type sensor nodes (NN). More specifically, the sensor network server (SS) stores the data transmitted from the base station (GW) into the database, while transmitting the sensing data based on the requests from the application server (AS) and the client (CL). Further, the sensor network server (SS) receives a control command from the base station (GW), and transmits the result obtained by the control command to the base station (GW).

The sensor network server (SS) includes a transceiver unit (SSSR), a memory unit (SSME), and a controller (SSCO). The sensor network server (SS) should also have a clock when performing the time synchronization management (GWDC).

The transceiver unit (SSSR) performs data transmission and reception with the base station (GW), the application server (AS), and the client (CL). More specifically, the transceiver unit (SSSR) receives the sensing data transmitted from the base station (GW), and transmits the sensing data to the application server (AS) or the client (CL).

The memory unit (SSME) includes a hard disc, and a nonvolatile memory device such as a flash memory. The memory unit (SSME) stores at least performance database (SSMR), data format information (SSMF), sensing database (SSDB), and terminal management table (SSTT). The memory unit (SSME) may also store programs to be executed by a CPU (not shown) of the controller (SSCO). Further, the memory unit (SSME) temporarily stores the updated firmware (GWTF) of the name-tag type sensor node, which was once stored in a terminal firmware registration unit (TFI).

The performance database (SSMR) is a database for storing evaluations (performances) of the organization and individuals, which are input from the name-tag type sensor nodes (NN) or from the existing data, together with the time data. The performance database (SSMR) is the same as the performance database (PDB) of FIG. 1A. The performance data is input from a performance input unit (MRPI).

The data format information (SSMF) includes a data format for communication, a method for separating the sensing data with a tag added in the base station (GW) and for storing in the database, and a method for responding to requests for data. As described below, the communication controller (SSCC) refers to the data format information (SSMF), typically after data reception and before data transmission, in order to perform data format conversion (SSDF) and data distribution (SSDS).

The sensing database (SSDB) is a database for storing the sensing data obtained by the name-tag type sensor nodes (NN), information of the name-tag type sensor nodes (NN), and information of the base stations (GW) through which the sensing data is transmitted from the name-tag type sensor nodes (NN), and the like. Columns are generated for each of the data elements such as acceleration and temperature to manage the data. It is also possible to generate tables for each of the data elements. In both cases, all the data is managed in association with the terminal information (TRMT) which is the ID of the obtained name-tag type sensor node (NN), and the information about the obtained time.

The terminal management table (SSTT) is a table containing information about which name-tag type sensor node (NN) is actually under the control of which base station (GW). When another name-tag type sensor node (NN) is added to the base station (GW), the terminal management table (SSTT) is updated.

The controller (SSCO) includes the central processing unit CPU (not shown) to control the transmission/reception of sensing data, and control the reading/writing of sensing data from/to the database. More specifically, the CPU executes the programs stored in the memory unit (SSME) to perform the processes of communication control (SSCC), terminal management information correction (SSTF), and data management (SSDA).

The communication control (SSCC) controls the timing of wired or wireless communication with the base station (GW), the application server (AS), and the client (CL). Further, as described above, the communication control (SSCC) converts the format of the data to be transmitted and received, to the data format in the sensor network server (SS), or to the data format specific to each communication target, based on the data format information (SSMF) stored in the memory unit (SSME). Then, the communication control (SSCC) reads the header portion indicating the type of the data, and distributes the data to the corresponding process. More specifically, the received data is transferred to the data management (SSDA), and the command for correcting the terminal management information is transferred to the terminal management information correction (SSTF). The destination of the transmission data is determined to be the base station (GW), the application server (AS), or the client (CL).

The terminal management information correction (SSTF) receives the command from the base station (GW) to correct the terminal management information, and updates the terminal management table (SSTT).

The data management (SSDA) manages the correction, acquisition, and addition of the data in the memory unit (SSME) For example, the data management (SSDA) stores each element of the sensing data into the appropriate column of the database based on the tag information. When the sensing data is read from the database, the data management (SSDA) performs processes such as selecting necessary data based on the time information and the terminal information, and sorting the data in order of time.

The sensor network server (SS) receives data through the base station (GW). Then, the data management (SSDA) classifies the received data, and stores in the performance database (SSMR) and in the sensing database (SSDB). This corresponds to the organizational dynamics data collection (BMB) in FIG. 1A.

The application server (AS) shown in FIG. 2B analyzes and processes the sensing data. An analysis application is activated upon request from the client (CL), or automatically at a specified time. The analysis application transmits a request to the sensor network server (SS) and obtains necessary sensing data. Further, the analysis application analyzes the obtained data, and then transmits the analyzed data to the client (CL). It is also possible that the analysis application stores the analyzed data directly to an analysis database.

The application server (AS) includes a transceiver unit (ASSR), a memory unit (ASME), and a controller (ASCO).

The transceiver unit (ASSR) performs the data transmission and reception with the sensor network server (SS) and the client (CL). More specifically, the transceiver unit (ASSR) receives a command transmitted from the client (CL), and transmits a data acquisition request to the sensor network server (SS). Further, the transceiver unit (ASSR) receives the sensing data from the sensor network server (SS), and transmits analyzed data to the client (CL).

The memory unit (ASME) includes a hard disc, and an external memory device such as a memory or an SD card. The memory unit (ASME) stores the setting conditions for analysis and the analyzed data. More specifically, the memory unit (ASME) stores a display condition (ASMJ), analysis algorithm (ASMA), analysis parameter (ASMP), terminal information-name (ASMT), analysis database (ASMD), correlation coefficient (ASMS), and combined table (CTB).

The display condition (ASMJ) temporarily stores conditions for display requested from the client (CL).

The analysis algorithm (ASMA) stores programs for analysis. The appropriate program is selected in response to the request from the client (CL). The analysis is performed by the selected program.

The analysis parameter (ASMP) stores, for example, parameters for feature amount extraction. When the parameters are changed in response to the request from the client (CL), the analysis parameter (ASMP) is rewritten.

The terminal information-name (ASMT) is a comparative table of the ID of a terminal, and the name and attribute or other information of a person wearing the terminal. Upon request from the client (CL), the name of the person is added to the terminal ID of the data received from the sensor network server (SS). When only data of a person corresponding to a certain attribute is obtained, the name of the person is converted to the terminal ID and a data acquisition request is transmitted to the sensor network server (SS), with reference to the terminal information-name (ASMT).

The analysis database (ASMD) is a database for storing the analyzed data. The analyzed data may be temporarily stored before transmission to the client (CL). It is also possible that a large amount of analyzed data is stored so that the analyzed data can be freely obtained in bulk. When the data is transmitted to the client (CL) while being analyzed, there is no need to use the analysis database (ASMD).

The correlation coefficient (ASMS) stores correlation coefficients determined by the correlation coefficient study (BMD). The correlation coefficient (ASMS) is used for the organizational activity analysis (BME).

The combined table (CTB) is a table for storing data relating to plural name-tag type sensor nodes aligned by the inter-data alignment (BMC).

The controller (ASCO) includes a central processing unit CPU (not shown) to control the data transmission/reception and to analyze the sensing data. More specifically, the CPU (not shown) executes the programs stored in the memory unit (ASME) to perform communication control (ASCC), analysis condition setting (ASIS), data acquisition request (ASDR), inter-data alignment (BMC), correlation coefficient study (BMD), and organizational activity analysis (BME), and terminal information-user reference (ASDU), or other processes.

The communication control (ASCC) controls the timing of wired or wireless communication with the sensor network server (SS) and the client (CL). Further, the communication control (ASCC) converts the format of the data, and distributes the data to appropriate destinations according to data types.

The analysis condition setting (ASIS) receives analysis conditions set by a user (US) through the client (CL), and stores the received analysis conditions into the memory unit (ASME). Further, the analysis condition setting (ASIS) generates a command to request data to the server, and transmits a data acquisition request (ASDR).

The data transmitted from the server based on the request of the analysis condition setting (ASIS), is aligned by the inter-data alignment (BMC) based on the time information of the data relating to arbitrary two persons. This is the same as the process of the inter-data alignment (BMC) in FIG. 1A.

The correlation coefficient study (BMD) is a process corresponding to the correlation coefficient study (BMD) in FIG. 1B. The correlation coefficient study (BMD) is performed using the analysis algorithm (ASMA). The result is stored in the correlation coefficient (ASMS).

The organizational activity analysis (BME) is a process corresponding to the organizational activity analysis (BME) in FIG. 1C. The organizational activity analysis (BME) is performed by obtaining the stored correlation coefficient (ASMS) and using the analysis algorithm (ASMS). The results of the analysis are recorded in the analysis database (ASMD).

The terminal information-user reference (ASDU) converts the data managed with the terminal information (ID) into the name or other designation of the user of each terminal, based on the terminal information-name (ASMT). The terminal information-user reference (ASDU) may also provide additional information such as the title and position of the user. The terminal information-user reference (ASDU) may be omitted, if not necessary.

The client (CL) shown in FIG. 2B interfaces with the user (US) for inputting and outputting data. The client (CL) includes an input/output unit (CLIO), a transceiver unit (CLSR), a memory unit (CLME), and a controller (CLCO).

The input/output unit (CLIO) serves as an interface with the user (US). The input/output unit (CLIO) includes a display (CLOD), a keyboard (CLIK), and a mouse (CLIM) and the like. It is also possible to connect another input/output device to an external input/output (CLIU) according to the necessity.

The display (CLOD) is an image display device such as a CRT (Cathode-Ray Tube) or a liquid crystal display. The display (CLOD) may include a printer and the like.

The transceiver unit (CLSR) performs the data transmission and reception with the application server (AS) or the sensor network server (SS). More specifically, the transceiver unit (CLSR) transmits the analysis conditions to the application server (AS) and receives the analysis results.

The memory unit (CLME) includes a hard disc, and an external memory device such as a memory or an SD card. The memory unit (CLME) stores information necessary for drawing, such as analysis condition (CLMP) and drawing setting information (CLMT). The analysis condition (CLMP) stores the conditions set by the user (US), such as the number of members to be analyzed and the selection of analysis method. The drawing setting information (CLMT) stores the information about the drawing position, namely, what is plotted and which part of the drawing. Further, the memory unit (CLME) may also store programs to be executed by a CPU (not shown) of the controller (CLCO).

The controller (CLCO) includes the CPU (not shown) to perform communication control, input of the analysis conditions from the user (US), drawing of the analysis results to be presented to the user (US) and the like. More specifically, the CPU executes the programs stored in the memory unit (CLME) to perform communication control (CLCC), analysis condition setting (CLIS), drawing setting (CLTS), and organizational activity display (BMF), or other processes.

The communication control (CLCC) controls the timing of wired or wireless communication with the application server (AS) or the sensor network server (SS). Further, the communication control (CLCC) converts the format of the data, and distributes the data to appropriate destinations according to data types.

The analysis condition setting (CLIS) receives analysis conditions specified by the user (US) through the input/output unit (CLIO), and stores in the analysis condition (CLMP) of the memory unit (CLME). Here, the period of the data used for analysis, member, type of analysis, and parameter for analysis, or other conditions are set. The client (CL) requests an analysis by transmitting the settings to the application server (AS), while performing the drawing setting (CLTS).

The drawing setting (CLTS) calculates a method to display analysis results based on the analysis condition (CLMP), as well as plotting positions. The results of this process are stored in the drawing setting information (CLMT) of the memory unit (CLME).

The organizational activity display (BMF) generates charts by plotting the analysis results obtained from the application server (AS). For example, the organizational activity display (BMF) plots a display like a radar chart, a time-series graph, and an organizational structure display, as shown in the organizational activity display (BMF) of FIG. 1C. At this time, the organizational activity display (BMF) also displays the attribute such as the name of the displayed person, if necessary. The generated display result is presented to the user (US) through the output device such as the display (CLOD). The user (US) can finely adjust the display position by an operation such as drag and drop.

<External Appearance of the Business Microscope Name-Tag Type Sensor Node>

FIGS. 3A to 3E are external views showing an example of the configuration of the name-tag type sensor node. The name-tag type sensor node has a strap attachment portion NSH to which a neck strap or a clip is attached. The name-tag type sensor node is worn on the neck or chest of the user.

Figure 3A:
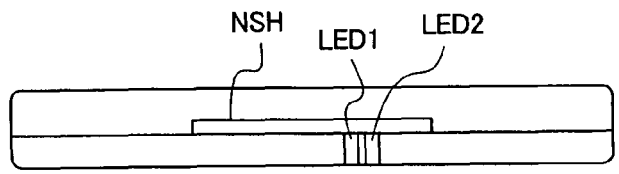
FIGS. 3A to 3E are external views of the name-tag type sensor node according to the first embodiment.

The surface with the strap attachment portion NSH is defined as the top side, and the opposite surface as the bottom side. Further, when the name-tag type sensor node is worn, the surface facing the other person is defined as the front side and the opposite surface as the back side. Still further, the surface positioned on the left side seen from the front side of the name-tag type sensor node is defined as the left side, and the surface opposite to the left side as the right side. Thus, FIG. 3A is a top view, FIG. 3B is a front view, FIG. 3C is a bottom view, FIG. 3D is a back view, and FIG. 3E is a left side view.

Figures 3B, 3E:
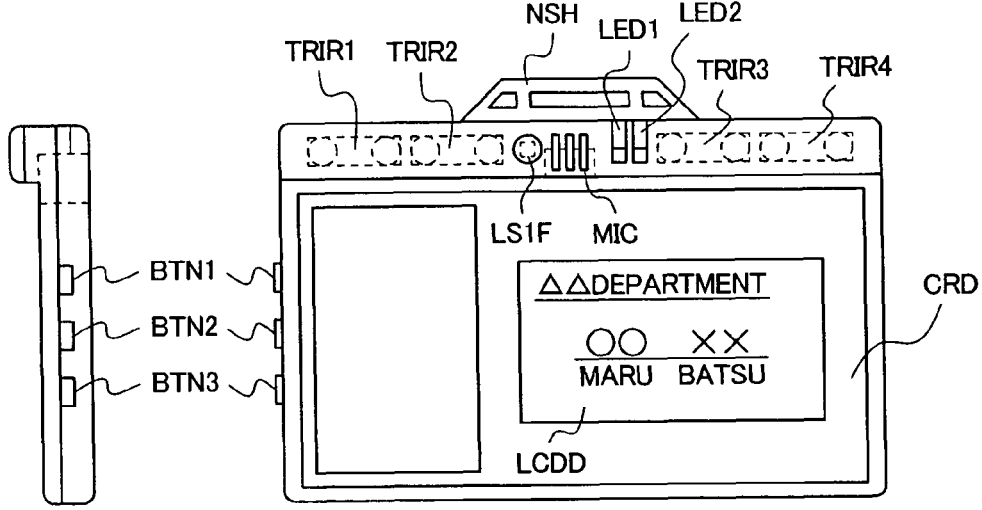
Figure 3C:
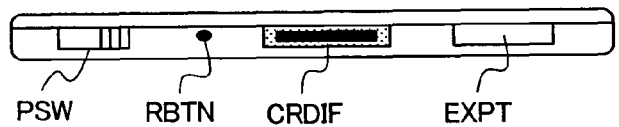
Figure 3D:
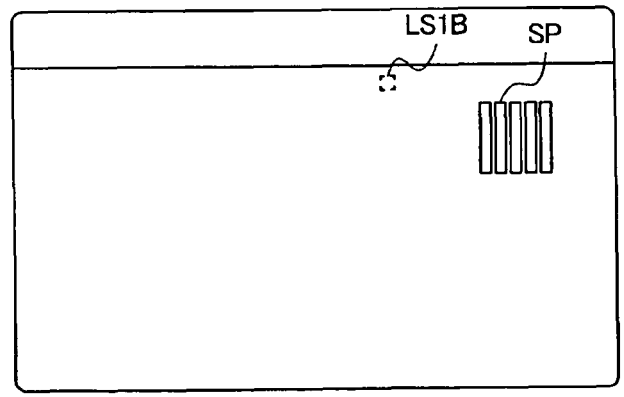

As shown in the front view of FIG. 3B, a liquid crystal display device (LCDD) is provided on the front side of the name-tag type sensor node. When the front side is facing the other person, the liquid crystal display device displays the content of display B as a name tag with the department and name of the wearer, which will be describe below. When the front side is facing the wearer, the liquid crystal display device displays the organizational activity feedback data for the wearer.

The material of the surface of the name-tag type sensor node is transparent, so that an inserted card CRD can be seen from the outside through the case material. The design of the name-tag surface can be changed by replacing the card (CRD) inserted into the name-tag type sensor node.

As described above, the name-tag type sensor node according to the present invention can be worn by a person in the same manner as in common name tags, allowing for obtaining physical quantities by sensors without bringing discomfort to the wearer.

In the top and front views of FIGS. 3A and 3B, the LED lamps LED1, LED2 are used for notifying the wearer and the person facing the wearer, of the state of the name-tag type sensor node. The lights of LED1 and LED2 are guided to the front side and the top side, respectively. The lighting state can be seen both from the wearer of the name-tag type sensor node and from the person facing the wearer.

As described above, the name-tag type sensor node includes the speaker SP. The speaker SP is used for notifying the wearer and the person facing the wearer, of the state of the name-tag type sensor node by buzzer or voice. The microphone MIC obtains the speech of the wearer of the name-tag type sensor node as well as the sound around the wearer.

The luminance sensors LS1F, LS1B are provided on the front and back of the name-tag type sensor node, respectively. From the luminance values obtained by the LS1F and LS1B, it is detected that the name-tag type sensor node of the wearer is reversed, which is notified to the wearer.

As is apparent from FIG. 3E, three buttons of BTN1, BTN2, BTN3 are provided on the left side of the name-tag type sensor node. These buttons are used for changing the operation mode of wireless communication, and switching the liquid crystal display.

In the bottom side of the name-tag type sensor node, there are provided a power switch PSW, a reset button RBTN, a cradle connector CRDIF, and an external expansion connector EXPT.

In the front side of the name-tag type sensor node, there are provided plural infrared transceivers TRIR1 to TRIR4. The provision of plural infrared transceivers is specific to the name-tag type sensor node. The infrared transceiver intermittently transmits the identification number (TRMD) of the own name-tag type sensor node by infrared radiation. Another function of the infrared transceiver is to receive the identification number transmitted by the name-tag type sensor node worn by the other person. In this way, the facing state is recorded about which name-tag type sensor node does and when it occurs. Thus, it is possible to detect the state of face-to-face communication between the wearers. In the example shown in FIGS. 3A to 3E, four infrared transceivers TRIR1 to TROR4 are provided in the upper portion of the name-tag type sensor node.

<Description of the Placement of the Infrared Transceiver Modules>

Figure 4A:
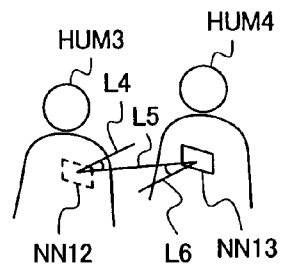
FIGS. 4A to 4C are views showing the placement of infrared transceiver modules in the name-tag type sensor node according to the first embodiment.

Next, the infrared placement in the name-tag type sensor node of this example will be described with reference to FIGS. 4A to 4C. FIG. 4A shows the positional relationship between two persons HUM3, HUM4 communicating face-to-face. It rarely happens that two persons are perfectly in front of each other. They often stand diagonally opposite to each other at about shoulder width. At this time, the facing state between the name-tag type sensor nodes may not be detected if the infrared transceivers have sensitivity only in the front of the name tag. It is necessary to have sensitivity at angles of about 30 degrees left and right relative to lines L4, L6 drawn from the surfaces of name-tag type sensor nodes NN2, NN3 worn by HUM3, HUM4, respectively.

Figure 4B:
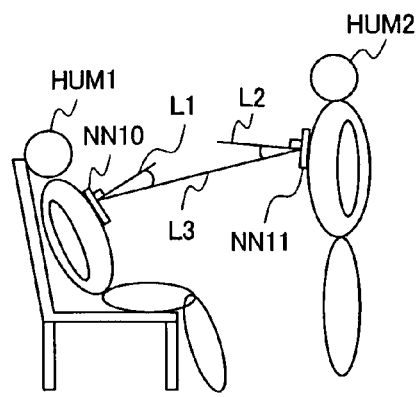

FIG. 4B shows the positional relationship when the person HUM1 sitting in a chair and the person HUM2 standing are communicating with each other. There is a difference in height position of the head between the person sitting in the chair and the person standing, so that the upper body of the person HUM1 sitting in the chair is slightly tilted upward. A line L3 connecting name-tag type sensor nodes NN10 and NN11 worn by HUM1 and HUM2, is located below lines L1, L2 drawn from the respective name-tag surfaces. Under this condition, the two name-tag type sensor nodes should have downward sensitivity in order to reliably detect the facing state.

Figure 4C:
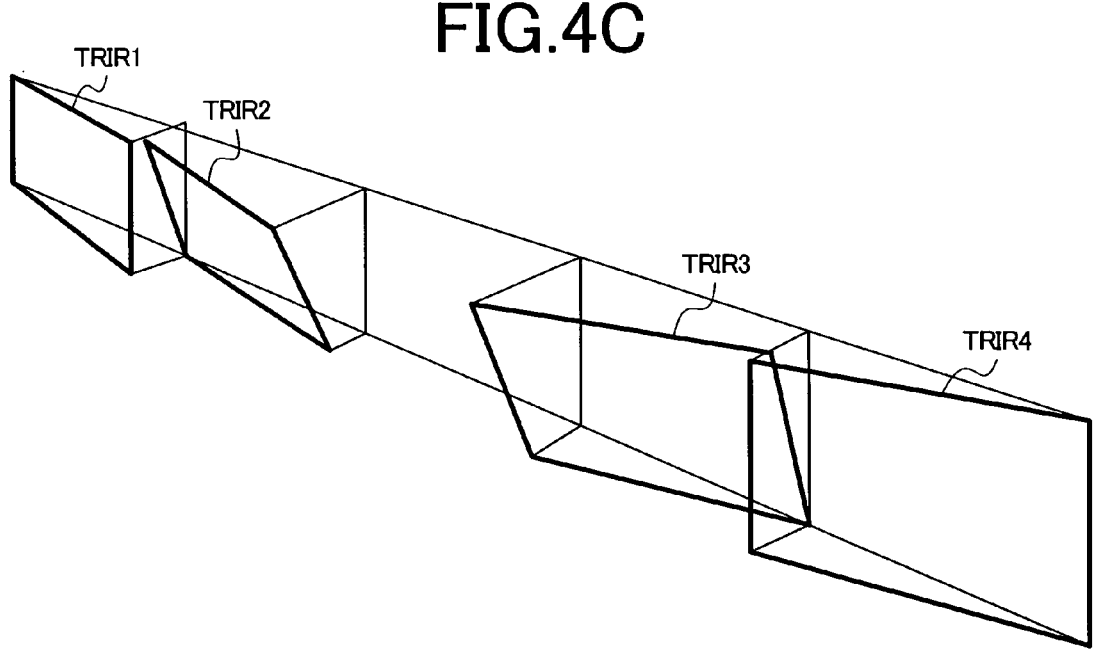

FIG. 4C shows an example of the placement of the infrared transceivers TRIR1 to TRIR4. The infrared transceivers TRIR1 and TRIR4, which are provided outside, are placed at an angle of 15 degrees outward in the horizontal direction. The infrared transceivers TRIR2 and TRIR3, which are provided inside, are placed at an angle of 15 degrees outward in the horizontal direction and at an angle of 30 degrees downward in the vertical direction. In addition, the infrared transceiver itself has sensitivity at an angle of about ±15 degrees. As a result, this placement realizes the sensitivity of 45 degrees downward, 15 degrees upward, and ±30 degrees left and right of the name tag in total. This makes it possible to reliably obtain the state of face-to-face communication between persons. It is needless to say that the number and angle of the infrared transceivers TRIR1 to TRIR4 are not limited to the placement in this example.

<Description of the Display Screen and Buttons>

As described above, the triaxial acceleration sensor (ACC) mounted on the name-tag type sensor node can detect movements of the wearer. At the same time, the triaxial acceleration sensor (ACC) can detect the orientation of the name-tag type sensor node by detecting the acceleration of gravity.

Figure 5:
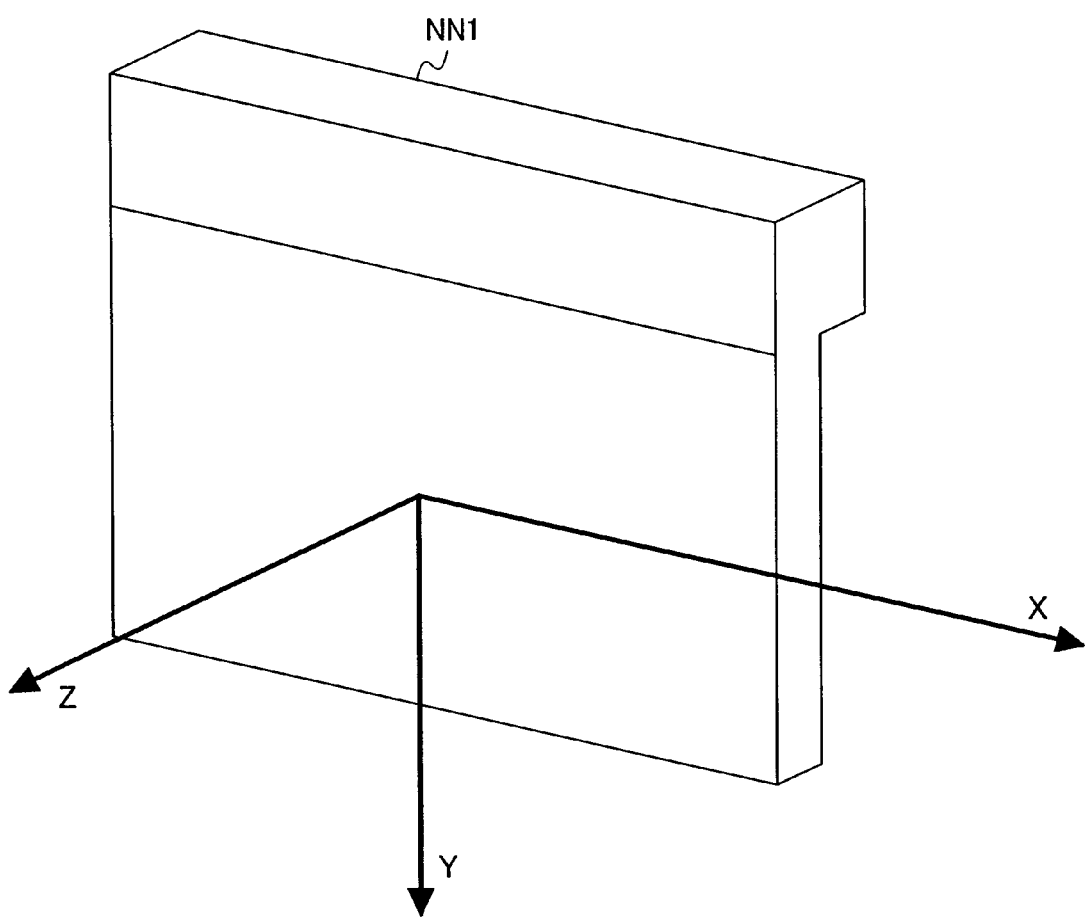
FIG. 5 is a view showing the axes of triaxial acceleration that are detected by the name-tag sensor node according to the first embodiment.

FIG. 5 shows the axes of the triaxial acceleration detected by the name-tag type sensor node of this example. The example defines that the acceleration applied in the horizontal direction of the name-tag type sensor node is X axis, the acceleration applied in the vertical direction is Y axis, and the acceleration applied in the cross direction is Z axis.

At this time, focusing on the acceleration detected in the Y axis. The Y axis is positive in the downward direction of the name-tag type sensor node. When the person wears the name-tag type sensor node and stops moving, the force of gravity acts on the bottom side of the name tag (in the Y axis direction), and thus 1 G is detected in the Y axis. When the person takes up the name-tag type sensor node and faces it toward that person, the bottom side of the name tag does not face in the gravity direction. Thus, the acceleration detected in the Y axis is a value smaller than 1 G. The value is negative when the name-tag type sensor node is completely turned upside down.

A node up/down detection circuit UDDET monitors whether the static acceleration applied to the Y axis is 1 G or a smaller value, in order to detect whether the name-tag type sensor node is facing the wearer or the other person. The name-tag type sensor node changes the content to be displayed on the liquid crystal display device based on a detection result, namely, an up/down detection signal UDDETS in FIG. 2A.

Here, the function of the display screen and buttons of the name-tag type sensor node will be described.
(1) When the Name-Tag Type Sensor Node is not Upside Down (and is Facing the Other Person)

When the name-tag type sensor node is facing the other person, the liquid crystal display device LCDD displays the personal data including the name and the department. At this time, the buttons are assigned in the following way:
Button 1: not assigned
Button 2: not assigned
Button 3: sift to power saving mode, release When an association is established between the name-tag type sensor node and the base station (when communication can be normally performed), the wireless transmission interval is extended to suppress the power consumption by pressing the button 3. On the other hand, the extended wireless transmission interval is returned to normal mode when the pressing the button 3.
(2) When the Name-Tag Type Sensor Node is Upside Down (and is Facing the Wearer)

Figure 6:
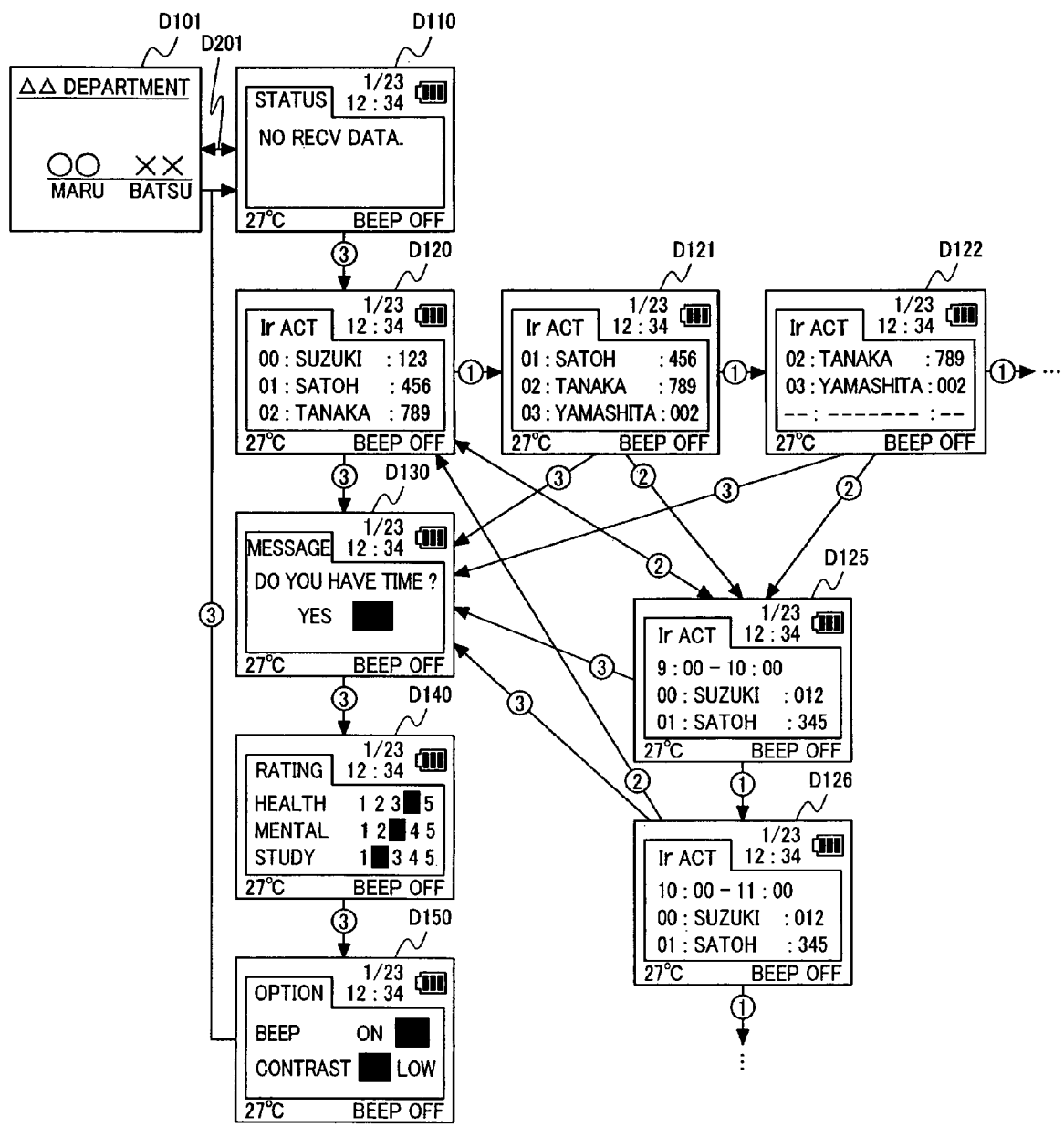
FIG. 6 is a view showing the button operation and screen transition of the name-tag type sensor node according to the first embodiment.

When the name-tag type sensor node is facing the wearer, the wearer is operating the name-tag type sensor node. The liquid crystal display device LCDD displays a name-tag state display screen (Status screen), a display screen of infrared communication history (IrAct screen), an organizational performance input screen (Rating screen), and a name tag setting screen (Option screen). At this time, the buttons are assigned in the following way:
Button 1: scroll, selection button
Button 2: determination, switch button
Button 3: paging button An example of the screen transition and button functions will be described with reference to FIG. 6. Reference numeral D101 denotes an example of the display screen when the name-tag type sensor node is not upside down (and is facing the other person). It functions as a name tag with the department and name of the wearer displayed thereon.

Here, when a wearer turns the display to face the wearer and the name-tag type sensor node is upside down (D201), the display is changed to Status screen (D110). The Status screen is a display screen displaying the operation of the name-tag type sensor node, such as the communication state with the base station and the detected infrared ID. The screen is changed to the IrAct screen (D120), Message screen (D130), Rating screen (D140), and Option screen (D150) each time the button 3 is pressed as the paging button. The display screen is returned to the Status screen when the button 3 is pressed in the Option screen.

The IrAct screen (D120) is a screen displaying the number of times the infrared radiation is received from the persons with whom the wearer has communicated face-to-face in the day. The infrared reception number is the information about the face-to-face communication time. This information shows that the larger the value, the longer the face-to-face communication time. Information for three persons is displayed on the screen at a time. As for the remaining persons other than the three persons, the screen is scrolled to display the information one by one (D121, D122) each time the button 1 is pressed. Further, the screen shifts to a mode of hourly display when the button 2 is pressed in the IrAct screen. In this case, the screen can also be scrolled by the button 1. When the button 2 is pressed again in the hourly display (D125, D126), the screen returns to the daily display (D120, D121, D122).

The Message screen is a screen for transmitting a message to a specific name-tag type sensor node from the application or from the other name-tag type sensor node, and transmitting a response to the message (D130).

In the Rating screen (D140), the wearer inputs subjective evaluations of the organizational performances at an arbitrary time. In this example, the performances in terms of health state (Health), mental state (Mental), and motivation to study (Study) are rated in five grades. The input ratings are transferred to the application server (AS), and are used for the correlation coefficient study (BMD) of the organizational activity analysis (BME).

<Cradle and Battery for Cradle of the Name-Tag Type Sensor Node>

The above described name-tag type sensor node of this example includes a secondary battery, in combination with a cradle as a means of charging the built-in secondary battery. Of course, an external power supply unit does not necessarily have the configuration of a cradle, as a means of supplying power from the outside to the name-tag type sensor node. For example, power may be supplied directly from an AC adaptor.

Figure 7:
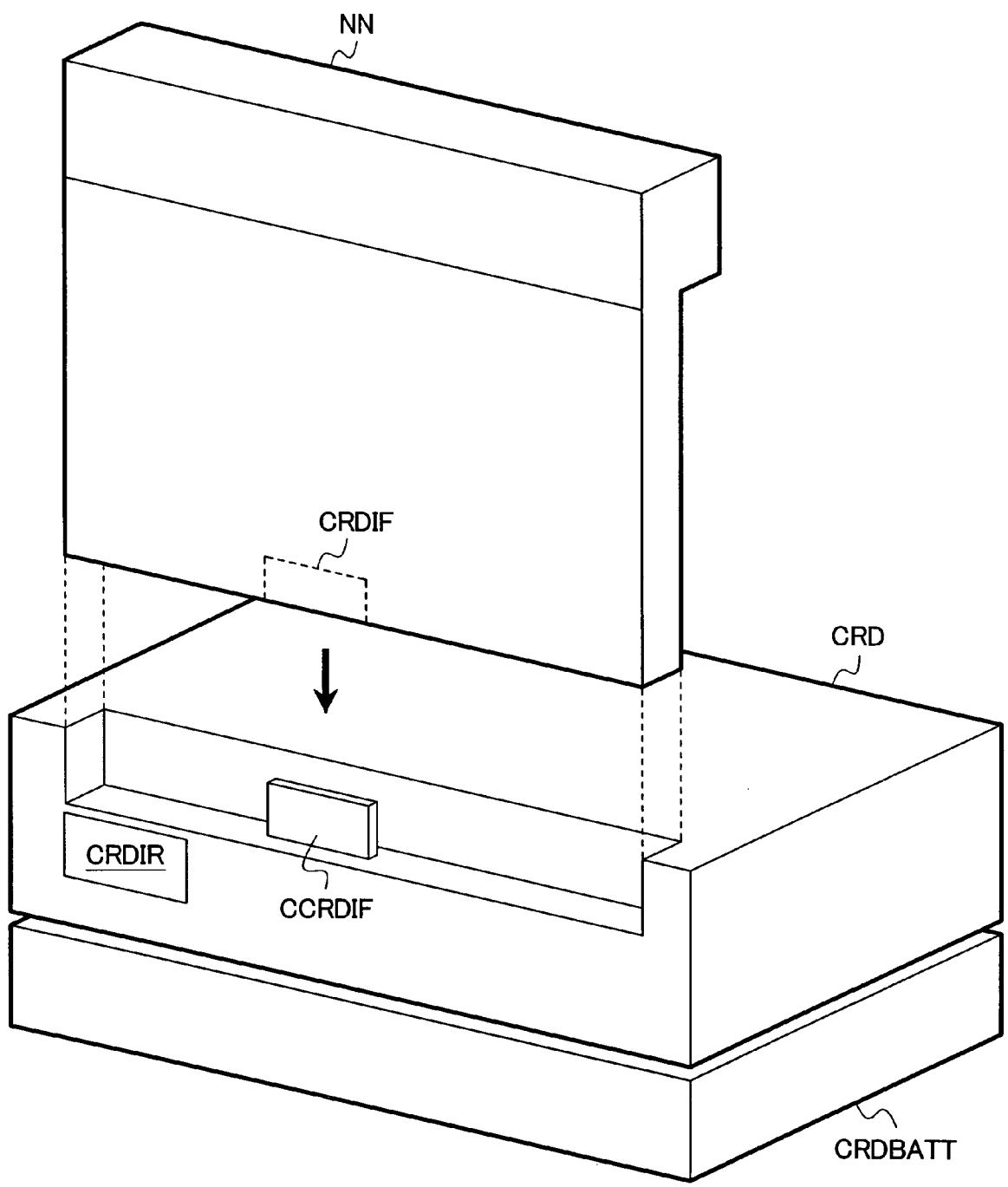
FIG. 7 is a view showing an example of the configuration between a cradle and the name-tag type sensor node according to the first embodiment.

FIG. 7 shows an example of the configuration between a cradle CRD and the name-tag type sensor node NN. In this example, a cradle connection interface CRDIF is provided in the bottom of the name-tag type sensor node NN. The cradle connection interface CRDIF is connected to a connection interface CCRDIF on the side of the cradle CRD, and then power is supplied.

Here, the cradle CRD does not include a battery, so that the power is constantly supplied from the AC adaptor and the like. The name-tag type sensor node is used in the office environment. For this reason, the name-tag type sensor node is assumed to be charged at night by attaching to the cradle after office hours. However, some workplaces have a rule that the last person turns off a breaker to shut the power off in the room. In this case, no power is supplied to the cradle at night, so that the name-tag type sensor node is not charged.

Figure 8:
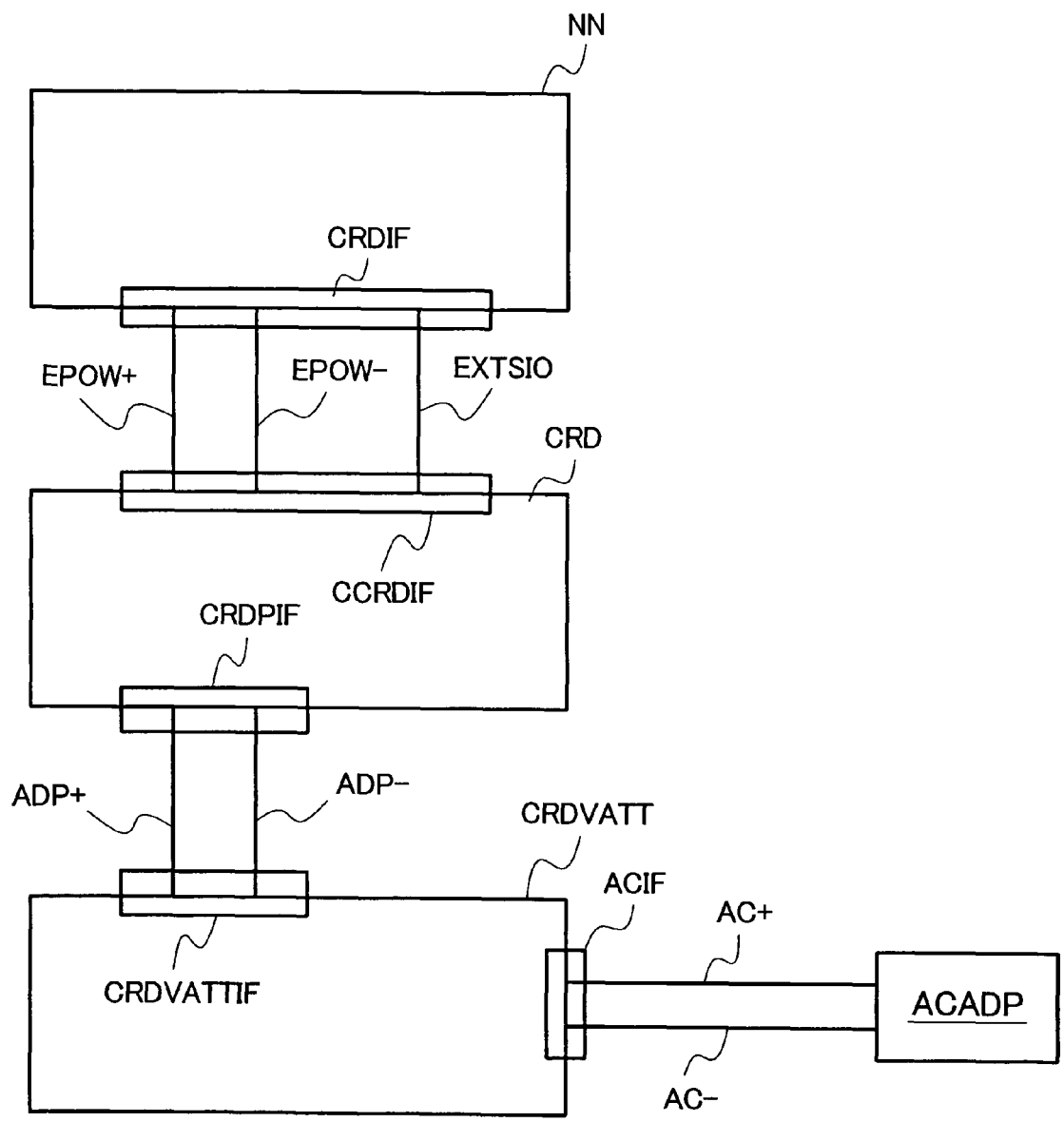
FIG. 8 is a view showing the connection relationship among a battery for cradle CRDBATT, cradle CRD, and the name-tag type sensor node according to the first embodiment.

In such workplaces, a secondary battery is connected to operate the cradle during night hours. This is the battery for cradle CRDBATT shown in FIG. 7, which is specific to this example. FIG. 8 shows the connection relationship among the name-tag type sensor node NN, the cradle CRD, and the battery for cradle CRDBATT.

The name-tag type sensor node NN is charged with power from the outside through an EPOW+terminal and an EPOW−terminal of the interface CRDIF with the cradle CRD. The cradle CRD supplies the power supplied from ADP+ and ADP−, to the EPOW+terminal and EPOW−terminal of the name-tag type sensor node NN. In this way, the built-in secondary battery of the name-tag type sensor node is charged.

Here, assuming a case in which power is supplied by the AC adaptor and the like through ADP+ and ADP− of the cradle. When the last person turns off the breaker, the power to the name-tag type sensor node is also shut off, and the built-in secondary battery of the name-tag type sensor node is not charged. In such a case, CRDBATT is inserted into the cradle CRD.

The battery for cradle CRDBATT is supplied with power from the AC adaptor (ACADP) and the like through AC+ and AC− of an external power supply terminal ACIF. Then, the battery for cradle CRDBATT charges the built-in secondary battery. When power is supplied from the external power supply terminal ACIF, the cradle CRD is directly supplied with the power through the cradle interface CRDBATTIF. In this way, the power of the built-in secondary battery is continued to be supplied to the cradle CRD, after the power supply from the AC adaptor ACADP is shut off. With this configuration, the built-in secondary battery of the name-tag type sensor node is reliably charged, thereby preventing missing data due to battery exhaustion.

Next, specific examples of the hardware configurations of the name-tag type sensor node, the cradle, and the battery for cradle will be sequentially described in detail with reference to the drawings.

<Hardware Configuration of the Name-Tag Type Sensor Node>

Figure 9:
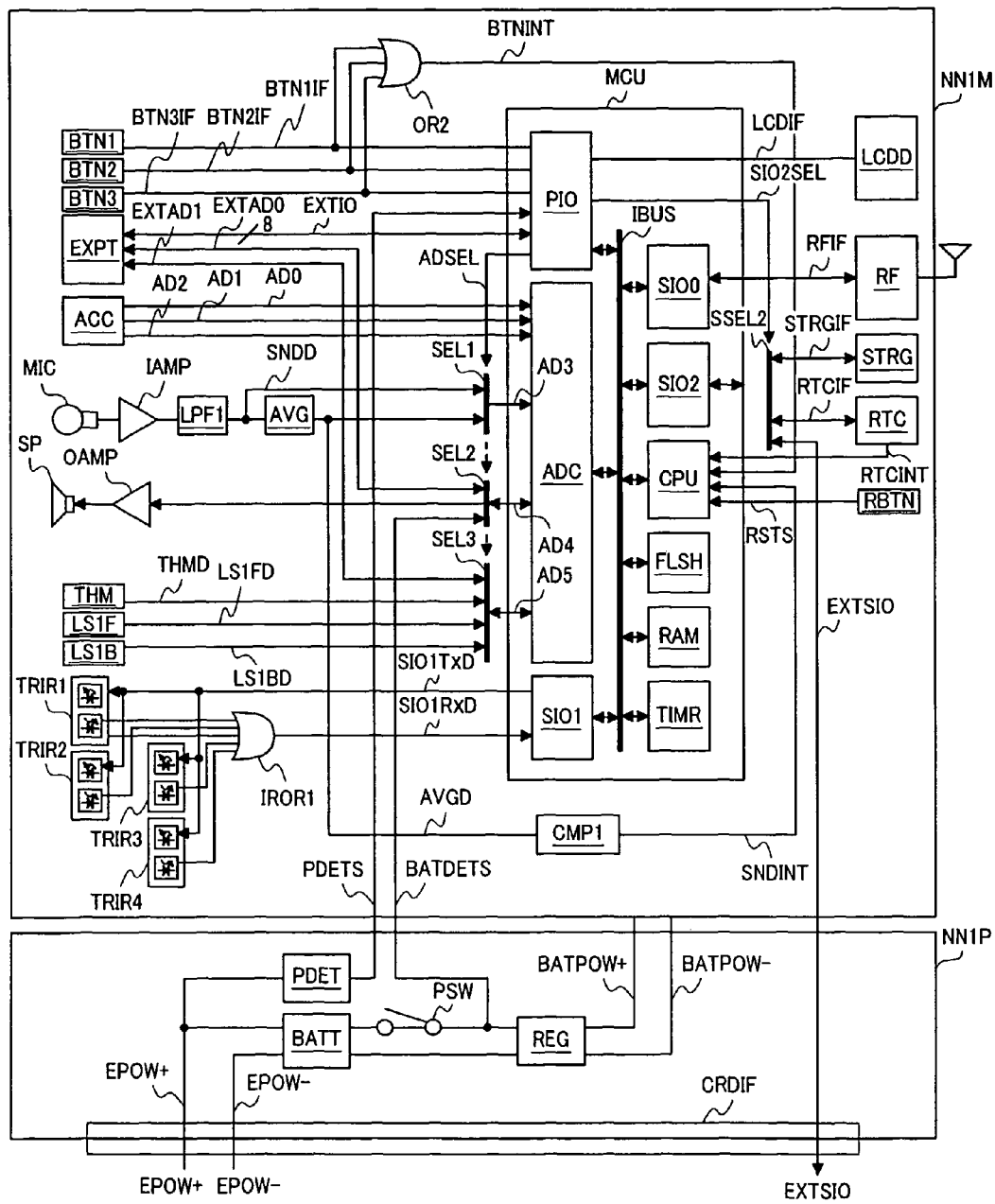
FIG. 9 is a block diagram showing a specific example of the hardware configuration of the name-tag type sensor node according to the first embodiment.

FIG. 9 shows a specific example of the hardware configuration of the name-tag type sensor node NN shown in FIG. 2A. The hardware of the name-tag type sensor node NN is roughly divided into a power supply unit NN1P and a main body NN1M.

The power supply unit NN1P includes a built-in secondary battery BATT, a regulator REG, a power switch PSW, and an external power detection circuit PDET. The power supply unit NN1P stabilizes the power from the secondary battery BATT by the regulator REG, and supplies the power to the main body NN1M through BATPOW+, PBTPAW−. The power supply unit NN1P includes the cradle interface CRDIF. When the power supply unit NN1P is attached to the cradle, the secondary battery BATT is charged. At the same time, the external power detection circuit PDET detects that the power is supplied from the outside, and notifies the main body by the external power detection signal PDETS. The power of the name-tag type sensor node can be turned on/off by the power switch PSW. Even when the power is turned off, the secondary battery is charged by attaching the name-tag type sensor node to the cradle.

In this example, the power is supplied from the cradle. However, the function and configuration of the power supply NN1P is the same when the power is supplied directly from the AC adaptor and the like, to the name-tag type sensor node. The PDETS signal is connected to a general purpose IO port PIO of the main body NN1M of the name-tag type sensor node. With this configuration, the main body of the name-tag type sensor node can recognize whether the power is supplied from the external power supply unit.

The name-tag type sensor node is mainly controlled by a microcomputer MCU of the main body NN1M. The microcomputer MCU is a large scale integrated circuit LSI that integrates various peripheral functions through an internal bus IBUS, in addition to a central processing unit CPU. Examples of typical peripheral functions incorporated in the microcomputer are a serial interface, an A/D converter, a memory, a timer, and a general purpose IO port. This example shows a microcomputer integrating three-channel serial interfaces (SIO0, SIO1, SIO2), an A/D converter (ADC), a timer (TIMR), a general purpose IO port (PIO), a random access memory (RAM), and a flash memory (FLSH).

The name-tag type sensor node NN converts the information obtained from the various sensors into digital values by the A/D converter ADC. Then, the name-tag type sensor node NN stores the digital values into the memory unit STRG together with the face-to-face communication information obtained by the infrared transceivers TRIR1 to TRIR4, while transmitting the data to the base station through a wireless communication circuit RF. Further, the name-tag type sensor node NN analyzes the data obtained from the sensors, and displays the results on the display device LCDD. The display device LCDD is controlled by the general purpose IO port PIO through LCDIF. The name-tag type sensor node NN further includes an expansion port EXPT capable of inputting/outputting analog and digital values for possible future expansion. The expansion port EXPT includes analog input/output terminals EXAD0, EXAD1, in addition to a signal EXTIO for the general purpose IO port.

The triaxial acceleration sensor ACC, the microphone MIC for obtaining voice, the temperature sensor THM, and the luminance sensors LS1F, LS1B are all connected to the A/D converter ADC. In this example, the A/D converter ADC has six input channels (AD0 to AD5). The channels AD4 and AD5 can also be used as D/A converters.

The A/D converter receives data from various sensors. In addition, the A/D converter is connected to analog input/output terminals EXTAD0, EXTAD1 of the external expansion port EXPT, and is also connected to a terminal voltage BATDETS of the secondary battery BATT to detect exhaustion of the secondary battery BATT.

Generally, the number of input ports of the A/D converter is limited while being connected to a wide variety of sensors. In this example, the number of ports is also insufficient for the number of sensors. In order to overcome this problem, one port is used in a time-sharing manner to allow for A/D conversion of the desired sensor information.

With respect to the data from the triaxial acceleration sensor ACC, the amount of change is significant and the frequency of acquisition is high. Thus, the data is independently assigned to AD0 to AD2.

The voice input from the microphone MIC is amplified in an input amplifier IAMP, and passes through a low pass filter LPF to cut frequency elements exceeding the Nyquist frequency. Then, it is obtained data SNDD as the real voice, as well as energy AVGD integrated by the integrating circuit AVG. An analog switch SEL1 selects between the data SNDD and the energy AVGD, and inputs to the channel AD3.

An analog switch SEL2 selects among the external input signal EXTAD0 from the external expansion port EXPT, the terminal voltage BATDETS of the secondary battery BATT, and the voice output to the speaker. Then, the analog switch SEL2 connects the selected signal to the channel AD4.

The voice output to the speaker is amplified by an output amplifier OAMP to drive the speaker SP.

An analog switch SEL3 selects among data THMD obtained by the temperature sensor THM, data LS1FD, LS1BD obtained by the luminance sensors LS1F, LS1B, and the external input signal EXTAD1 from the external expansion port EXPT. Then, the analog switch SEL3 inputs the selected signal to the channel AD5.

The analog switches SEL1, SEL2, SEL3 provided in the A/D converter are controlled by an ADSEL signal output from the general purpose IO port PIO.

The wireless communication circuit RF communicates with the microcomputer MCU through RFIF which is a serial communication. Because the amount of communication data is large and the usage frequency is high, a serial interface channel 0 (SIO0) is exclusively assigned to the wireless communication circuit RF. Further, the infrared transceivers should be kept ready to perform a waiting operation, in order to receive the ID from the other name-tag sensor node and obtain face-to-face communication information. Thus, the infrared transceivers are connected to a serial port channel 1 (SIO1). In this example, the transmission circuits of the four infrared transceivers TRIR1 to TRIR4 are driven by a channel 1 serial transmission signal SIO1TxD which is common to all the transmission circuits. With respect to the reception, the receivers of the four infrared transceivers TRIR1 to TRIR4 are ORed (IROR1), and connected to a channel 1 serial reception signal SIO1RxD.

A signal STRGIF is for the memory unit STRG. A signal RTCIF is for a real time clock RTC to obtain absolute time. A communication means EXTSIO communicates with the cradle. These signals also use a serial communication interface, but the usage frequency is limited. Thus, a serial port channel 2 (SIO2) is used in a time-sharing manner. At this time, a selector SSEL2 switches the signals by a signal SIO2SEL output from the general purpose IO port PIO.

The operation timing of the CPU of the name-tag type sensor node is determined by the following factors: the time information from the real time clock RTC; when the voice obtained by the microphone MIC exceeds certain energy; and when input from the buttons (BTN1, BTN2, BTN3) is received. These factors can generate interrupt signals RTCINT, SNDINT, BTNINT to the CPU, respectively. A comparator CMP1 detects that energy AVGD of the voice exceeds a predetermined value, and generates the interrupt signal SNDINT to the CPU. The button inputs from BTN1, BTN2, BTN3 can be obtained by the general purpose IO port (PIO) through BTN1IF, BTN2IF, BTN3IF, respectively. Further, an OR circuit (OR2) detects the input change and generates the button interrupt signal BTNINT.

When a reset button RBTN is pressed, the CPU can be reset through a reset interface RSTS.

<Hardware Configuration of the Name-Tag Type Sensor Node Cradle>

Figure 10:
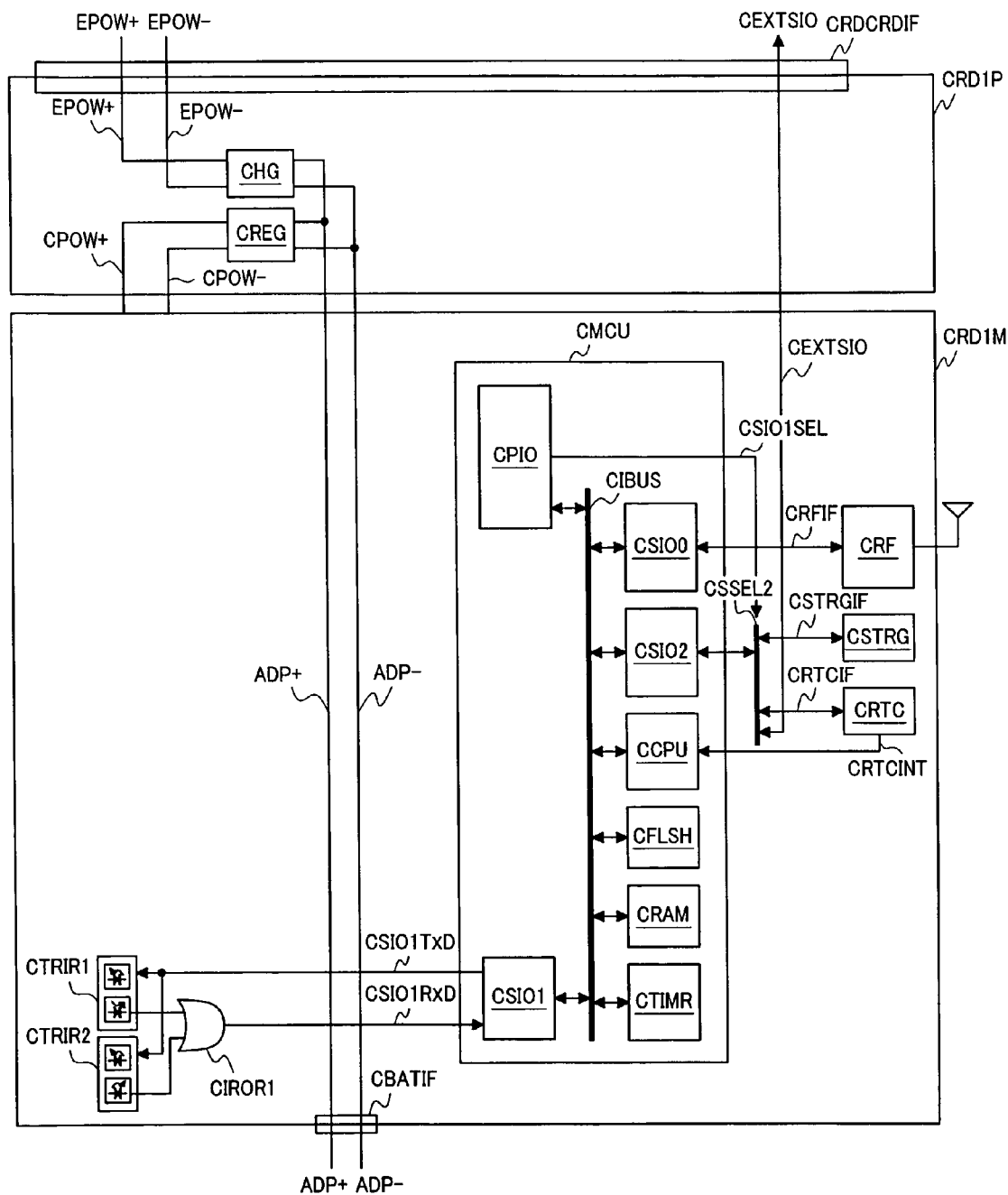
FIG. 10 is a block diagram showing a specific example of the hardware configuration of the cradle CRD for the name-tag type sensor node according to the first embodiment.

A specific example of the hardware configuration of the name-tag type sensor node cradle CRD will be described with reference to FIG. 10. The name-tag type sensor node cradle of this example is roughly divided into a power supply unit CRD1P and a main body CRD1M.

The power supply unit CRD1P includes a charging circuit CHG for charging the built-in secondary battery of the name-tag type sensor node through the cradle interface CCRDIF from an external power supply, and a regulator CREG for stabilizing the power for the operation of the cradle itself. The cradle is supplied with power through terminals ADP+, ADP− of a cradle battery interface CBATIF, by means of an external power supply such as the AC adaptor, or the battery for cradle described below.

The power supplied through ADP+, ADP− is stabilized by the regulator CREG, and is supplied to the cradle main body CRD1M through CPOW+, CPOW−. At the same time, the power is used for charging the secondary battery of the name-tag type sensor node through EPOW+, EPOW− of an interface CRDCRDIF between the cradle and the name-tag type sensor node, from the charging circuit CHG.

The main body CRD1M of the name-tag type sensor node cradle has a sensor node circuitry including: a wireless communication circuit CRF for performing wireless communication; a microcomputer CMCU for controlling the wireless communication circuit CRF; infrared transceivers CTRIR1 and CTRIR2; a real time clock CRTC; and a memory unit CSTRG. The wireless communication circuit CRF, the microcomputer CMCU for controlling the wireless communication circuit CRF, and the infrared transceivers CTRIR1 and CTRIR2 correspond to the wireless communication circuit RF, the microcomputer MCU for controlling the wireless communication circuit RF, and the infrared transceivers TRIRI1 to TRIR4 in the name-tag type sensor node, respectively. These components can communicate with the base station (GW) of the name-tag sensor node. The cradle serves to supply power to an object attached thereto, and generally has only the power supply unit. The sensor node circuitry incorporated in the main body CRD1M is specific to this example.

The cradle is mainly controlled by the microcomputer CMCU of the main body. The microcomputer CMCU is an LSI that integrates various peripheral functions through an internal bus CIBUS, in addition to a central processing unit CCPU. In this example, the microcomputer integrates three-channel serial interfaces (CSIO0, CSIO1, CSIO2), a timer (CTIMR), a general purpose IO port (CPIO), a random access memory (CRAM), and a flash memory (CFLSH).

The wireless communication circuit CRF communicates with the microcomputer CMCU through CRFIF which is a serial communication. Because the amount of communication data is large and the usage frequency is high, a serial interface channel 0 (CSIO0) is exclusively assigned to the wireless communication circuit CRF. Further, the infrared transceivers CTRIR1 and CTRIR2 should be kept ready to perform a waiting operation, in order to receive the ID from the other name-tag sensor node and obtain face-to-face communication information. Thus, the infrared transceivers are connected to a serial port channel 1 (CSIO1). In this example, transmission circuits of the two infrared transceivers CTRIR1 and CTRIR2 are driven by a channel 1 serial transmission signal CSIO1TxD which is common to all the transmission circuits. With respect to the reception, the receivers of the two infrared transceivers CTRIR1 and CTRIR2 are ORed (CIROR), and connected to a channel 1 serial reception signal CSIO1RxD.

A signal CSTRGIF is for the memory unit CSTRG. A signal CRTCIF is for the real time clock CRTC to obtain absolute time. A communication means CEXTSIO communicates with the cradle. These signals also use a serial communication interface, but the usage frequency is limited. Thus, a serial port channel 2 (CSIO2) is used in a time-sharing manner. At this time, a selector CSSEL2 switches the signals by a signal CSIO2SEL output from the general purpose IO port PIO.

That is, the cradle of this example has a function of detecting that the cradle is facing the name-tag type sensor node, and wirelessly transmitting the information. The cradle is assumed to be placed on a desk. When a person wearing the name-tag type sensor node sits in front of the desk, an infrared communication is performed between the name-tag type sensor node and the cradle. In this way, information is recorded about who is sitting in that place and when he/she is.

<Hardware Configuration of the Battery for Cradle>

A specific example of the hardware configuration of the battery for cradle will be described with reference to FIG. 11. The hardware of the battery for cradle includes a secondary battery BATTS2, and a circuit BCHG for charging the secondary battery BATTS2. The cradle is supplied with power through BBATIF having two terminals ADP+, ADP−. When the AC adopter is connected to the battery for cradle through diodes D1, D2, power is directly supplied to the cradle by the AC adaptor through the terminals AC+, AC−. On the other hand when the AC adaptor is not connected to the battery for cradle, power is supplied to the cradle from the secondary battery BATTS2.

In this example, the secondary battery BATTS2 includes batteries connected in two-parallel and two-series arrays. Each battery is the same as the secondary battery incorporated in the name-tag type sensor node. Logically, the secondary battery incorporated in the name-tag type sensor node would be charged with the power of one battery. However, the secondary battery is generally charged with a high voltage.

For this reason, it is designed to use a series connection to gain voltage, as well as a two-parallel connection to store a sufficient amount of power.

<Communication Operation of the Name-Tag Type Sensor Node>

Next, an example of the communication operation of the name-tag type sensor node will be described. The name-tag type sensor node obtains physical quantities necessary to calculate organizational activities. The name-tag type sensor node displays the output on the name tag while transmitting to the base station. The name-tag type sensor node is used by a person wearing it, and preferably small and lightweight. Thus, it is necessary to have a small battery for operating the name-tag type sensor node. In order to continuously obtain physical quantities from the sensors while reducing power consumption, the acquisition of the physical quantities from the sensors and the transmission operation of the sensor data from the sensors, are intermittently performed.

This sequence will be described with reference to FIGS. 12A to 12F. FIGS. 12A to 12F show an example of the timing of obtaining sensor data as physical quantity data from the sensors, the timing of transmitting the sensor data, and the timing of writing the sensor data into the memory unit. FIG. 12A shows the timing of obtaining voice from the microphone by the A/D converter. Generally, in order to obtain a voice waveform, it is necessary to perform sampling at a frequency of several kHz to several tens of kHz. This example shows the timing of sampling at an even interval of time TSN1. Similarly, FIG. 12B shows the timing of obtaining acceleration by the A/D converter at a constant interval of TNS2. FIG. 12C shows the timing of obtaining temperature and luminance by the A/D converter. The acceleration is obtained at an interval of time TSN2. The temperature and luminance are obtained at an interval of time TSN3. Generally, voice is the largest in terms of physical quantity per unit of time, followed by acceleration, temperature, and luminance.

Generally, the timing of sampling of the physical quantities is arbitrary depending on the sensor type, and the magnitude of the timing interval is not limited. Here shows an example of obtaining data from the sensors at constant intervals of TSN1<TSN2<TSN3.

The physical quantities obtained by the sensors are wirelessly transmitted as a packet of an arbitrary size. FIG. 12D shows the timing of wirelessly transmitting the packet. A data set SENSD1, which contains 4 data pieces of voice, 2 data pieces of acceleration, and 1 data piece of temperature and of luminance, is wirelessly transmitted as a packet TRD1. Similarly, data sets SENSD2, SENSD3 are wirelessly transmitted as packets TRD2, TRD3, respectively. The wireless transmission interval is not necessarily constant. Here shows an example of the timing of wireless transmission at a constant interval of time TTR1.

FIG. 12E shows the timing of storing the physical quantity data obtained by the sensors into the memory unit. In this example, there is shown the timing of storing the data set SENSD1 containing 4 data pieces of voice, 2 data pieces of acceleration, and 1 data piece of temperature and of luminance, into the memory unit as data CMBD1. Similarly, the data sets SENSD2, SENSD3 are stored in the memory unit as data CMBD2 and CMBD3, respectively. The frequency and interval of the writing timing to the memory unit are not limited in the present invention.

FIG. 12F shows the state of the external power detection signal PDETS for detecting the connection of the name-tag type sensor node to the external power supply. When PDETS indicates a high level, the name-tag type sensor node is attached, for example, to the cradle and supplied with power from the outside to charge the secondary battery.

Generally when a terminal and a receiver are distant from each other or affected by outside noise or other problems, the wireless communication may not be normally performed. This is the same in the case of communication between the name-tag type sensor node and the base station. There might be a possibility that the communication is not normally completed, for example, when there is no base station near the name-tag type sensor node. In the example shown in FIGS. 12A to 12F, the packets TRD2, TRD4, TRD5 are not normally transmitted. Even if the transfer to the base station is failed, the data is not missing because the data CMBD2, CMBD4, CMBD5 corresponding to TRD2, TRD4, TRD5 obtained from the sensors, are still stored in the memory unit. The data is retransferred to the base station after communication is recovered. Finally, it is possible to prevent missing data to be collected. The retransmission of the data stored in the memory unit to prevent missing data, is called bulk transmission.

The bulk transmission is performed when the name-tag type sensor node is connected to the external power supply. This sequence is specific to this example.

FIG. 12F shows that the PDETS signal is changed to a high level at a timing T1 and the external power supply is connected to the name-tag type sensor node. The name-tag type sensor node starts the bulk transmission upon detection of the PDETS signal.

In the case of the wireless transmission timing shown in FIG. 12D, when the PEDTS signal is changed to the high level at the timing T1, a packet TRD2R generated from the data CMBD2 stored in the memory unit is transferred after transfer of the packet TRD6. The packet TRD2R corresponds to the packet TRD2 that has failed to be transferred. Similarly, TRD4R as retransmission data of the packet TRD4, and TRD5R as retransmission data of the packet TRD5 are transferred after transfer of the packets TRD7, TRD8, respectively.

The amount of transferred data increases during the bulk transmission. Thus, the transfer interval TTR1 is changed to TTR2 which is shorter than TTR1. This is done, as described above in FIG. 2A, by switching the time bases TB1, TB2 by TMGSEL in the transfer timing controller TRTMG, and by switching the data to be communicated by appropriately controlling the communication data selector TRDSEL.

In this example, the data is continuously obtained from the sensors after the external power supply is connected. However, for example, when the name-tag type sensor node is not worn by a person and data is not necessary, the data acquisition from the sensors may be interrupted for bulk transmission. Also in this case, the bulk transmission can be effectively performed by reducing the transfer interval.

<Description of the Operation of the Name-Tag Type Sensor Node>

The operation software of the name-tag type sensor node is called firmware. The firmware is stored in the flash memory FLSH incorporated in the microcomputer MCU shown in FIG. 9. Sometimes it is necessary to change the operation software of the name-tag type sensor node due to failure of the software or change of the operation algorithm. Generally, the flash memory is rewritten by dedicated hardware provided by the manufacture of the microcomputer. However, such hardware does not support simultaneous rewriting of plural flash memories. The name-tag type sensor node is worn by an individual to recognize the activities of the organization. Thus, the number of name-tag type sensor nodes is equal to the number of wearers. It takes a lot of time and unrealistic to collect all the name-tag type sensor nodes for each firmware update and to rewrite the flash memories one by one.

In this example, the name-tag type sensor node NN has a function of wirelessly transferring the firmware to be updated and updating such firmware. This sequence will be described with reference to the drawings.

In the business microscope system shown in FIGS. 2A, 2B, the name-tag type sensor node firmware SSTF to be updated is registered in the memory unit SSME of the sensor network server SS. Although the registration means TFI is not so limited, for example, the firmware may be transferred by FTP through a network NW.

Figure 14:
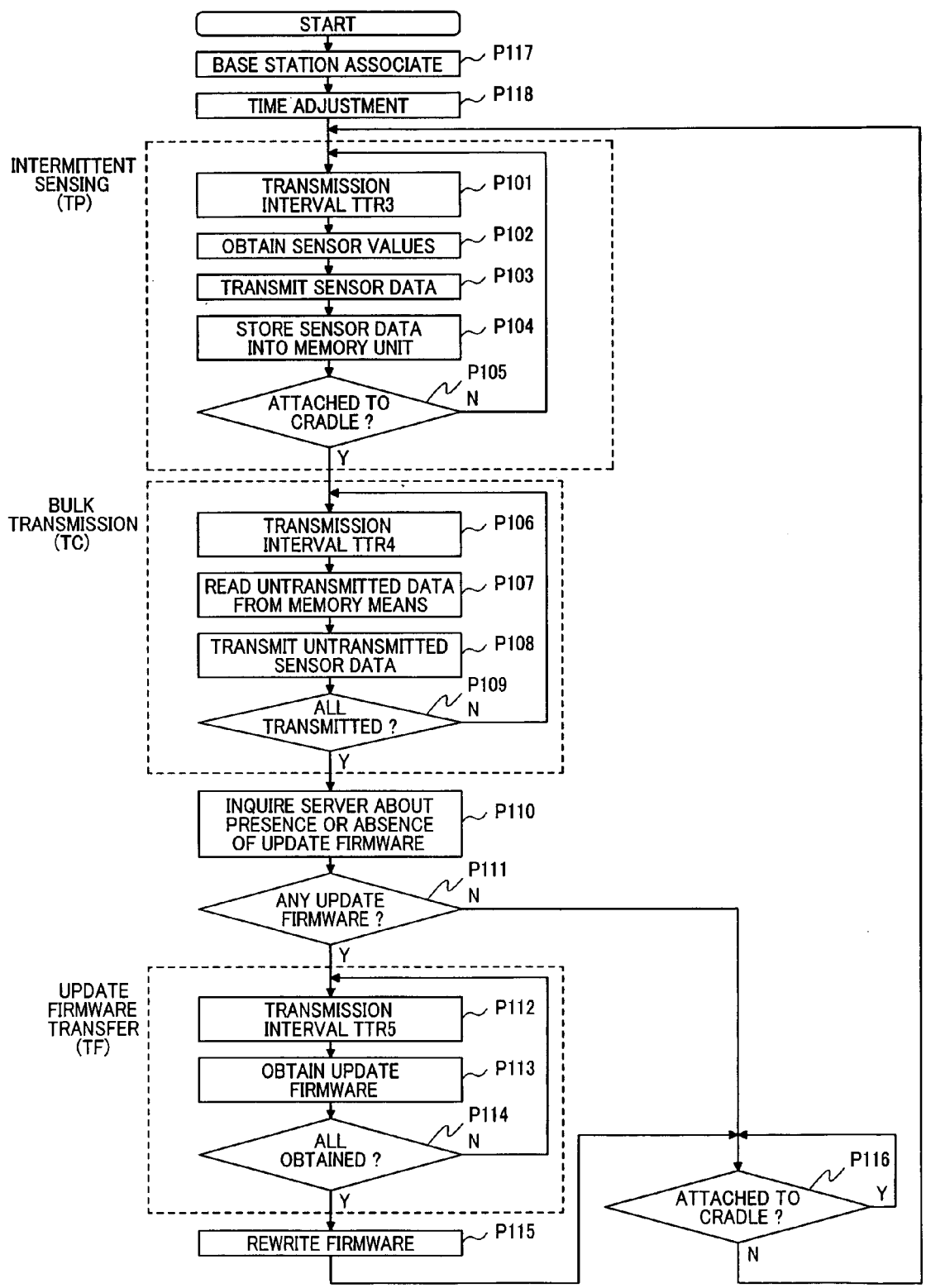
FIG. 14 is a flowchart showing the process of the name-tag type sensor node according to the first embodiment.

The operation of the name-tag type sensor node including update of the firmware will be described with reference to FIGS. 13A to 13D and FIG. 14. FIGS. 13A to 13D show the flow of data and the timing. It is shown that the data is obtained by the sensors, transferred from the name-tag type sensor node to the base station, and transferred to the sensor network server SS. FIG. 14 is a process flowchart of the name-tag type sensor node.

When the power is on and the operation is started, the name-tag type sensor node searches the base station and performs connection operation called associate (P117). Then, the name-tag type sensor node performs time adjustment process to synchronize the sensing time with the other name-tag type sensor node (P118). Next, as described above, the name-tag type sensor node obtains sensor information in an intermittent manner (P102), transmits the sensor data (P103), and stores the sensor data into the memory unit (P104). The process is performed for each interval of TTR3 (P101), unless the name-tag type sensor node is attached to the cradle (P105). FIGS. 13A to 13D show an example of the flow of sensor data SND10, SND11, SND12, SND13, SND14, and SND15 that is transmitted from the sensor node of FIG. 13C to the base station of FIG. 13B at an interval of TTR3. The base station normally receives the sensor data, and transfers the sensor data as SND21, SND22, SND24, and SND25 to the sensor network server (SS) of FIG. 13A. At this time, sensor data SND10, SND13, SND14 indicated by the dotted lines is not normally transferred to the base station due to disturbance or other problems, and thus not transferred to the sensor network server. This is repeated during the intermittent sensing operation (TP).

FIG. 13D shows an example of the case in which the name-tag type sensor node is connected to the external power supply by attaching the name-tag type sensor node to the cradle, or other means. At this time, when the external power detection signal PDETS is changed to a high level, the name-tag type sensor node moves to the bulk transmission operation (TC). In the bulk transmission TC, the name-tag type sensor node reads sensor data not normally transmitted, of the sensor data stored in the memory unit (P107), and transmits to the base station (P108). This is repeated until all the data is transmitted (P109) at an interval of TTR4 (106).

At this time, it is defined as TTR4<TTR3, which is a feature of the present invention. Because the name-tag type sensor node is attached to the cradle, the power supply is stable and the radio wave environment is good. With these conditions, it is possible to effectively transfer a large amount of data represented by bulk transmission data, without exhausting the battery.

When there is no untransmitted data, the name-tag type sensor node moves to an operation of transferring update firmware (TF). Here, the name-tag type sensor node first inquires the sensor network server whether update firmware is registered in the server, through the base station (P110). More specifically, the name-tag type sensor node transmits a query packet (FDRQ1) to the base station. Then, the base station further transmits a query packet (FDRQ2) to the sensor network server. When there is no update firmware (P111), the operation is arbitrary until the name-tag type sensor node is removed from the cradle. The normal intermittent sensing operation may be performed, or the operation may be stopped. The flow of FIG. 14 shows an example of stopping the operation (P116).

When update firmware is present, the update firmware is transferred to the name-tag type sensor node from the sensor network server through the base station (P113). In the example of FIGS. 13A to 13D, a packet FD2 is transferred from the sensor network server to the base station, and a packet FD2 is transferred from the base station to the name-tag type sensor node. This is repeated at an interval of TTR5 (P112) until all the update firmware is transferred (P114).

At this time, it is defined as TTR5<TTR3, which is a feature of the present invention. Because the name-tag type sensor node is attached to the cradle, the power supply is stable and the radio wave environment is good. With these conditions, it is possible to effectively transfer the data desired to be reliable, which is represented by update firmware, without exhausting the battery.

When all the update firmware is transferred, an operation of rewriting firmware (TFC) is actually performed (P115). The operation is arbitrary until the name-tag type sensor node is removed from the cradle after completion of the rewriting. FIG. 14 shows an example of stopping the operation (P116). When the name-tag type sensor node is removed from the cradle, it returns to the normal intermittent sensing operation (TP).

<Low Power Operation of the Infrared Transceivers>

As described above, the name-tag type sensor nodes are synchronously operated. A method of reducing the power consumption will be described with reference to FIGS. 15A to 15K. FIGS. 15A to 15K show the relationship among the sensor information acquisition timing, the wireless transmission/reception timing, and the infrared transmission/reception timing, when a name-tag type sensor node 1 and a name-tag type sensor node 2 face each other.

FIG. 15A shows the timing of obtaining acceleration and voice. FIG. 15B shows the timing of wirelessly transmitting/receiving the obtained sensor information.

FIG. 15C shows the timing that an infrared transceiver 1 of the name-tag type sensor node 1 transmits its own ID. Similarly, FIGS. 15D, 15E, 15F show the timing of transmissions from infrared transceivers 2, 3, 4 of the name-tag type sensor node 1.

Since the name-tag type sensor nodes are synchronously operated, their timings of transmitting infrared radiation are known to each other.

In other words, the receiver waits for at least one transmission timing interval. More specifically, as shown in FIG. 15G, the receiver of the infrared transceiver 1 of the name-tag type sensor node 2 performs a waiting operation (IRRT1) during a period when the infrared transceivers 1 to 4 of the name-tag type sensor node 1 transmit at least once, namely during RTT1, IRTT2, IRTT3, and IRTT4. This is the same for the infrared transceivers 2, 3, 4 of the name-tag type sensor node 2. As shown in FIGS. 15H, 15I, 15J, the receivers can perform the waiting operation in a time-sharing manner (IRRT2, IRRT3, IRRT4).

Generally, the waiting state of the infrared receiver increases the power consumption. Thus, as described above, the intermittent operation is performed to reduce the power consumption of the infrared receiver to one fourth or less.

Further, since the name-tag type sensor nodes are synchronized with each other, there is no need to constantly perform the infrared transmission and reception. In the example shown in FIG. 15K, the infrared transmission and reception are performed at an interval IRNIT1. During a period when the infrared transmission and reception are not performed, MPU of the name-tag type sensor nodes 1 and 2 is switched from a normal operation mode (MPUMD1) to a low power consumption state (MPUMD2) in order to reduce the power consumption.

The cradle is placed on the desk and the name-tag type sensor node is attached to the cradle after office hours. Thus, during the period when the name-tag type sensor node is attached to the cradle, the power supply is stable, thereby ensuring stable communication.

As described above, according to the configuration and operation, when the name-tag type sensor node attached to the cradle, a large amount of data, such as bulk transmission data, is transferred at an increased communication frequency. Alternately, the data desired to be reliable, such as rewriting data of the firmware of the name-tag type sensor node, is transferred. This allows for the data transfer without exhausting the battery of the name-tag type sensor node and without unnecessarily compressing the communication bandwidth.

What is claimed is:

1. A sensor node for measuring and transmitting physical quantities, comprising:
    a controller for controlling the measurement of the physical quantities by driving a plurality of sensors;
    a wireless communication circuit for transmitting physical quantity data obtained by the controller from the plurality of sensors;
    a battery for supplying power to the controller, the wireless communication circuit, and the sensors; and
    a detector for detecting that power is supplied from an external power supply unit for supplying power to the controller, the wireless communication circuit, and the sensors, or for charging the battery,
    wherein, when the detector detects that power is supplied from the external power supply unit, the controller controls to increase the frequency of communication in the wireless communication circuit.

2. The sensor node according to claim 1, further comprising a memory unit for storing the physical quantity data obtained from the sensors,
    wherein, when the detector detects that power is supplied from the external power supply unit, the controller controls to retransfer the physical quantity data, which has failed to be transferred from the wireless communication circuit to a base station and is still stored in the memory unit, to the base station.

3. The sensor node according to claim 1,
    wherein, when the detector detects that power is supplied from the external power supply unit, the controller controls to rewrite software that controls the controller.

4. The sensor node according to claim 1,
    wherein the sensors include a plurality of infrared transceivers for detecting that the sensor nodes face each other, and
    wherein the plurality of infrared transceivers are mounted on the sensor node at different angles.

5. The sensor node according to claim 1, further comprising a display device,
    wherein the controller displays organizational dynamics calculated based on the physical quantity data obtained from the plurality of sensors, on the display device.

6. The sensor node according to claim 5,
    wherein the sensors include an acceleration sensor,
    wherein the controller detects whether a wearer wears or holds the sensor node, according to the gravity direction detected by the acceleration sensor, and
    wherein, when the wearer wears the sensor node, the controller displays the name and department of the wearer on the display device, and when the wearer holds the sensor node, the controller displays the organizational dynamics on the display device.

7. The sensor node according to claim 1,
    wherein, when the physical quantity data is not successfully communicated from the wireless communication circuit to a base station, the controller determines that the base station is not present, and controls to reduce the communication frequency of the physical quantity data to the base station.

8. The sensor node according to claim 1, further comprising a button that can be operated by the wearer,
    wherein, when the physical quantity data is not successfully communicated from the wireless communication circuit to a base station, the controller determines that the base station is not present, and controls to reduce the communication frequency to the base station upon detecting that the wearer has pressed the button.

9. The sensor node according to claim 1,
    wherein the sensors include two luminance sensors,
    wherein the two luminance sensors are respectively mounted on the front and back of a case of the sensor node, and
    wherein a difference between the front and back sides of the case is detected by comparing luminance values obtained from the two luminance sensors.

10. The sensor node according to claim 4, further comprising a cradle that is placed on a desk and used as the external power supply unit, the cradle including:
    an infrared transceiver for detecting that the sensor nodes face each other;
    a controller for driving the infrared transceiver; and
    a wireless communication circuit for transmitting face-to-face communication information obtained by the controller,
    wherein the infrared transceivers of the sensor node perform infrared communication with the infrared transceiver of the cradle, and
    wherein the controller of the sensor node detects that the wearer of the sensor node has sat in front of the desk, based on an output of the infrared transceivers of the sensor node.

11. A sensor node for measuring and transmitting physical quantities, comprising:
    a controller for controlling the measurement of the physical quantities by driving a plurality of sensors;
    a wireless communication circuit for transmitting physical quantity data obtained by the controller from the plurality of sensors;
    a battery for supplying power to the controller, the wireless communication circuit, and the sensors; and
    a detector for detecting that power is supplied from an external power supply unit for supplying power to the controller, the wireless communication circuit, and the sensors, or for charging the battery,
    wherein, upon the detector detecting that power is supplied from the external power supply unit, the controller controls to switch data to be communicated by the wireless communication circuit, from a first type of data to a second type of data for which there is a greater desire for reliability than for the first type of data.

12. The sensor node according to claim 11, further comprising a memory unit for storing the physical quantity data obtained from the sensors, wherein, when the detector detects that power is supplied from the external power supply unit, the controller controls to retransfer the physical quantity data, which has failed to be transferred from the wireless communication circuit to a base station and is still stored in the memory unit, to the base station.

13. The sensor node according to claim 11, wherein, when the detector detects that power is supplied from the external power supply unit, the controller controls to rewrite software that controls the controller.

14. The sensor node according to claim 11, wherein the sensors include a plurality of infrared transceivers for detecting that the sensor nodes face each other, and wherein the plurality of infrared transceivers are mounted on the sensor node at different angles.

15. The sensor node according to claim 11, further comprising a display device, wherein the controller displays organizational dynamics calculated based on the physical quantity data obtained from the plurality of sensors, on the display device.

16. The sensor node according to claim 15, wherein the sensors include an acceleration sensor, wherein the controller detects whether a wearer wears or holds the sensor node, according to the gravity direction detected by the acceleration sensor, and wherein, when the wearer wears the sensor node, the controller displays the name and department of the wearer on the display device, and when the wearer holds the sensor node, the controller displays the organizational dynamics on the display device.

17. The sensor node according to claim 11, wherein, when the physical quantity data is not successfully communicated from the sensor node to a base station, the controller determines that the base station is not present, and controls to reduce the communication frequency of the physical quantity data to the base station.

18. The sensor node according to claim 11, further comprising a button that can be operated by the wearer, wherein, when the physical quantity data is not successfully communicated from the sensor node to a base station, the controller determines that the base station is not present, and controls to reduce the communication frequency to the base station upon detecting that the wearer has pressed the button.

19. The sensor node according to claim 11, wherein the sensors include two luminance sensors, wherein the two luminance sensors are respectively mounted on the front and back of a case of the sensor node, and wherein a difference between the front and back sides of the case is detected by comparing luminance values obtained from the two luminance sensors.

20. The sensor node according to claim 14, further comprising a cradle that is placed on a desk and used as the external power supply unit, the cradle including:

an infrared transceiver for detecting that the sensor nodes face each other;

a controller for driving the infrared transceiver; and a wireless communication circuit for transmitting face-to-face communication information obtained by the controller, wherein the infrared transceivers of the sensor node perform infrared communication with the infrared transceiver of the cradle, and wherein the controller of the sensor node detects that the wearer of the sensor node has sat in front of the desk, based on an output of the infrared transceivers of the sensor node.

* * * * *